Figure 2A:
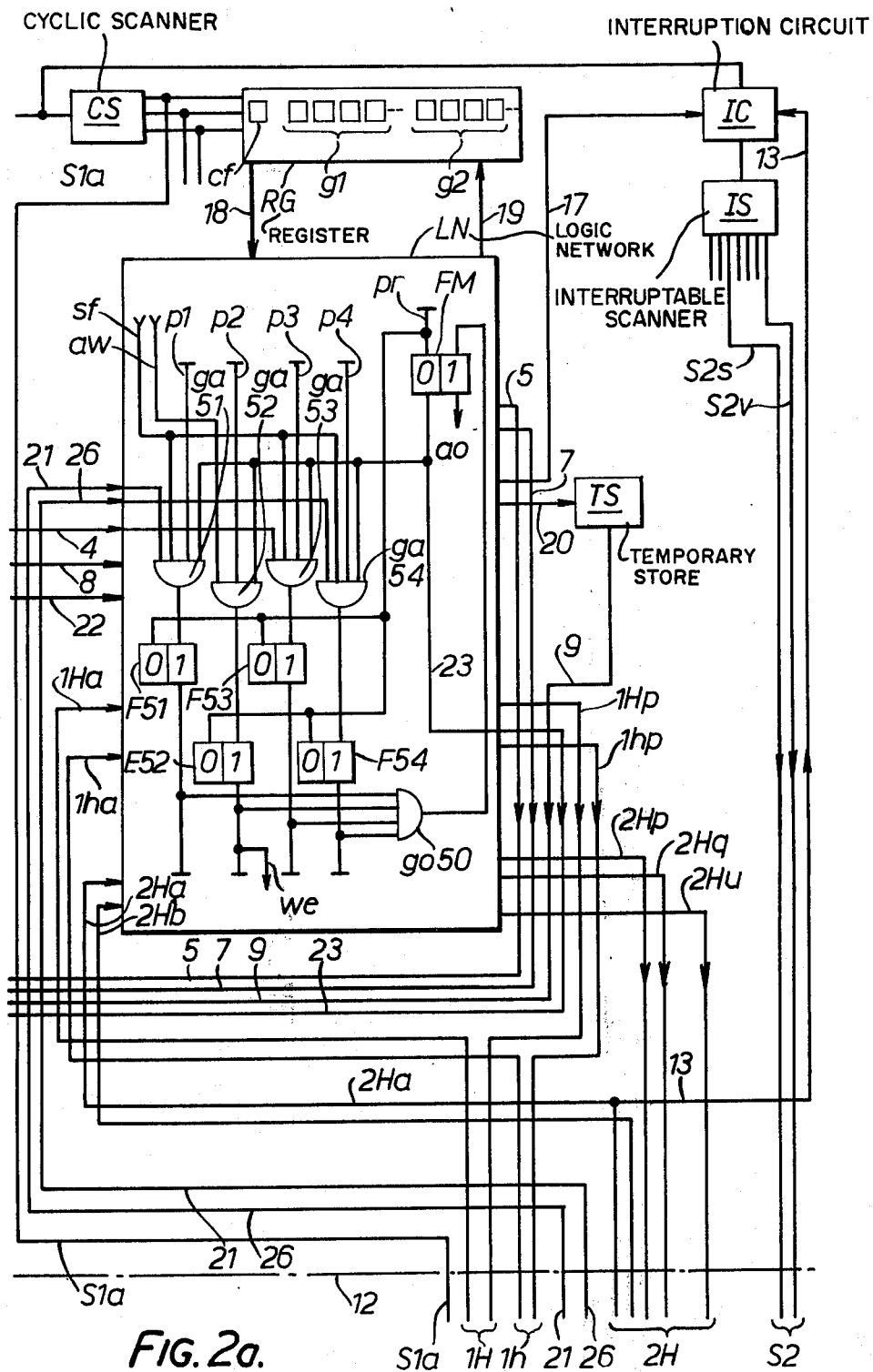

United States Patent [19]
Trueman et al.

[11] 3,974,341
[45] Aug. 10, 1976

[54] TELECOMMUNICATION EXCHANGE

[75] Inventors: Roy Trueman, Toton; Colin Warsop, Beeston; Graham Godfrey, Wollaton; John Malcolm Prestidge, Chaddesden, all of England

[73] Assignee: Plessey Handel und Investments A.G., London, England

[22] Filed: May 24, 1974

[21] Appl. No.: 472,453

[30] Foreign Application Priority Data
May 31, 1973   United Kingdom............... 25903/73

[52] U.S. Cl............................ 179/18 J; 179/18 EB
[51] Int. Cl.²................... H04Q 11/04; H04M 3/22
[58] Field of Search ........... 179/18 EB, 15 AT, 18 J

[56] References Cited
UNITED STATES PATENTS

| | | | |
|---|---|---|---|
| 3,601,546 | 8/1971 | Lee................................ | 179/18 EB |
| 3,737,873 | 6/1973 | Puccini....................... | 179/18 EB X |
| 3,838,226 | 9/1974 | Warman et al. ................... | 179/18 J |

*Primary Examiner*—Thomas A. Robinson
*Attorney, Agent, or Firm*—Scrivener Parker Scrivener & Clarke

[57] ABSTRACT

A telephone exchange which includes a register having a number of sections in each of which information about a call may be registered; a signal interface unit corresponding to each register section; a time-shared highway; a logic network connected both to the register and to the highway; and a scanner which scans the register sections simultaneously with the interface units corresponding thereto. The units serve as an interface between the time-shared highway and other apparatus (mainly supervisory sets) in the exchange. Information from a caller reaches a register section by way of the time-shared highway and the logic network. Information is processed in the logic network as and when appropriate.

3 Claims, 12 Drawing Figures

FIG. 1.

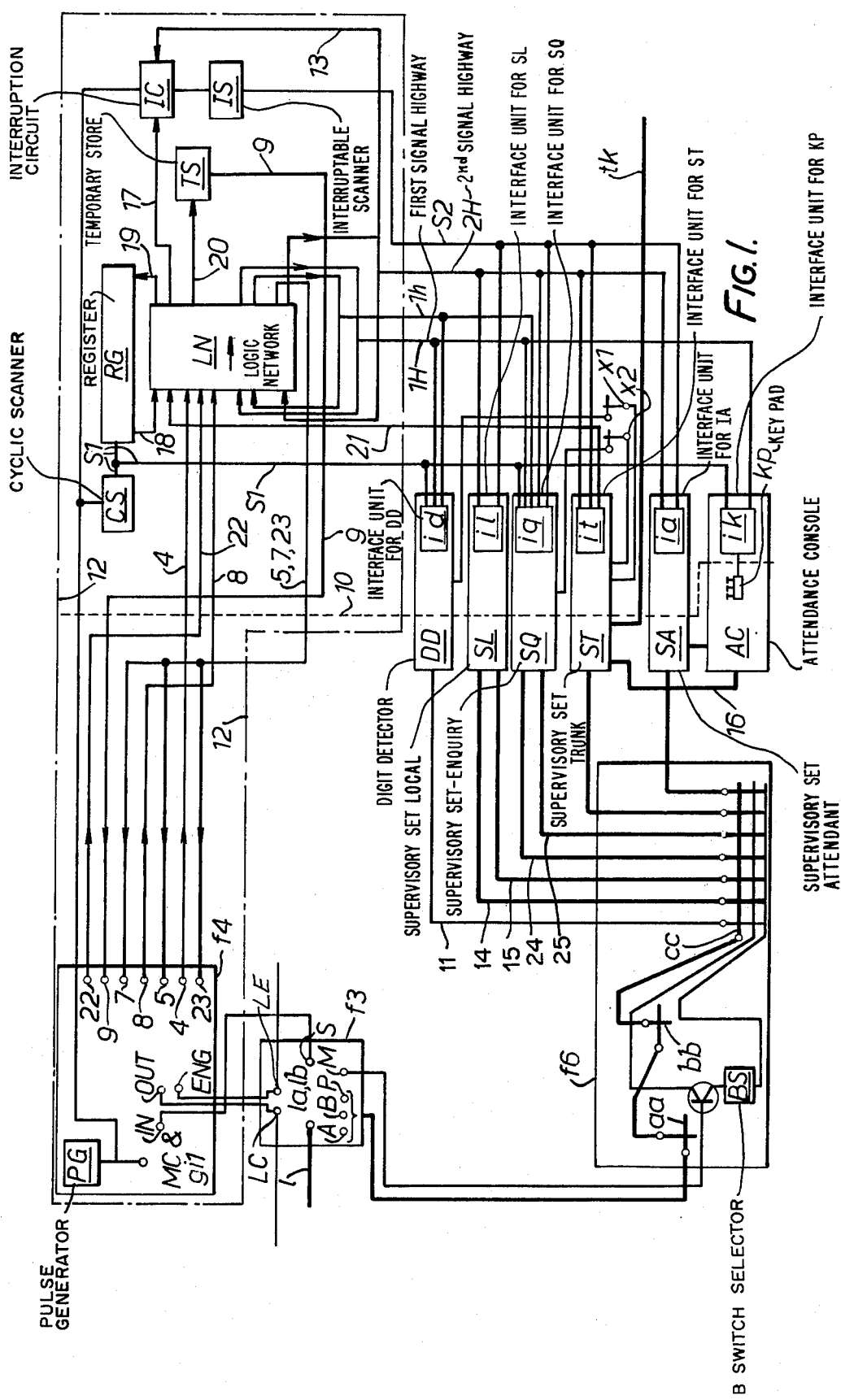

3,974,341

TELECOMMUNICATION EXCHANGE

This invention relates to telecommunication exchanges, particularly private branch telephone exchanges.

Telecommunication exchanges comprise equipment which is individual to lines served by the exchange, and other equipment which is used in common by all the lines as and when required. It is a purpose of the present invention to reduce the cost of the common equipment by employing recent advances in semi-conductor technology. Since the cost of common equipment in relation to the number of lines served is higher at a small exchange than at a large exchange, the advantages of the present invention are particularly noticeable at private branch exchanges. Another purpose of the present invention is to provide equipment to control the setting up of calls which can be employed at exchanges of different types.

According to the invention there is provided a telecommunication exchange which includes: a register having a number of register sections, in any one of which information relating to the establishment of a call may be registered; a signal interface unit corresponding to each register section; a time-shared signal highway; a logic network connected both to the register and to the highway; and a cyclic scanner which scans the register sections and the interface units, and, once in each scanning cycle, effectively connects a scanned register section to the logic network at the same time as the interface unit corresponding to the scanned register section is effectively connected to the signal highway.

Figure 2B:
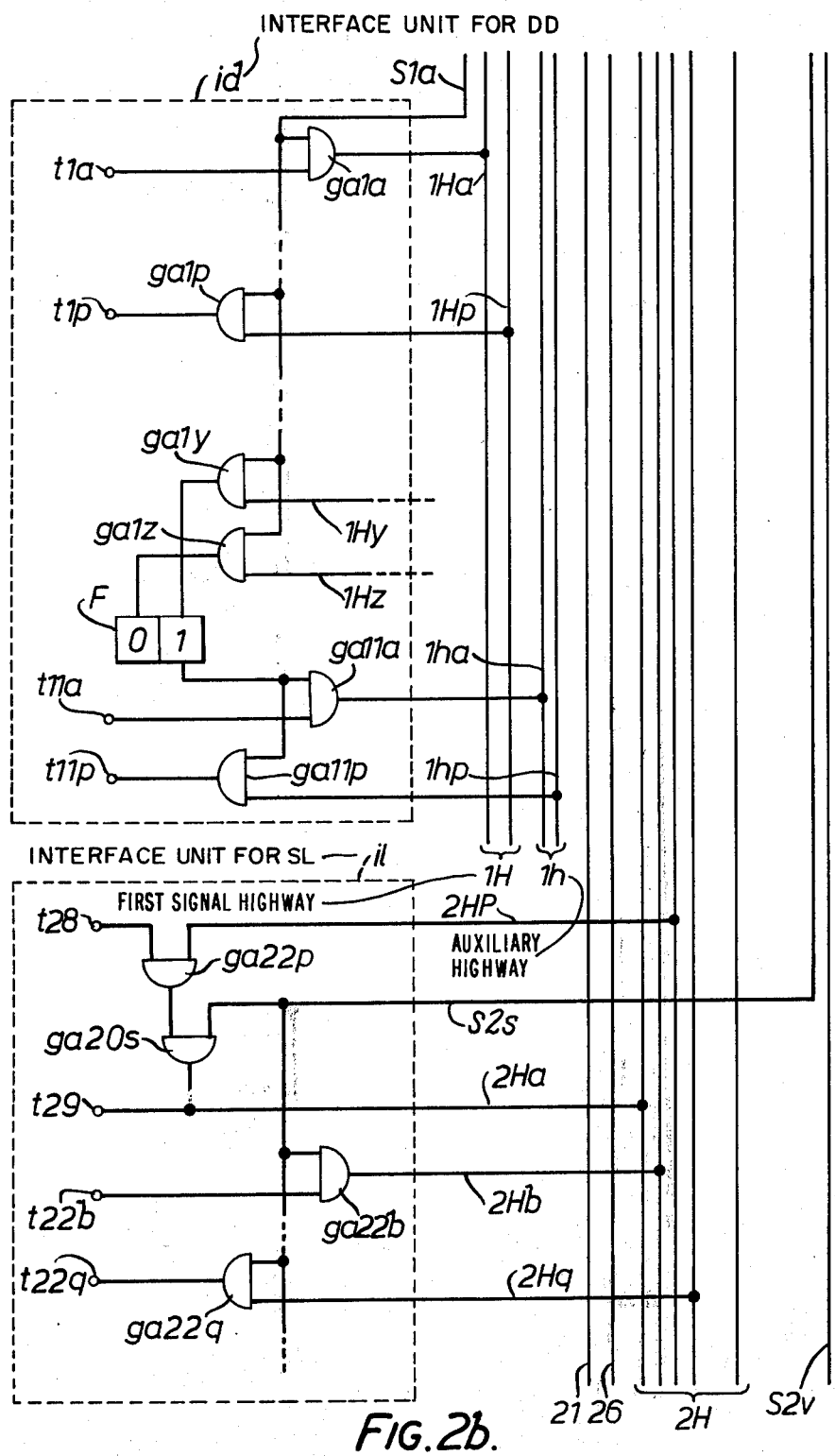
Figure 2C:
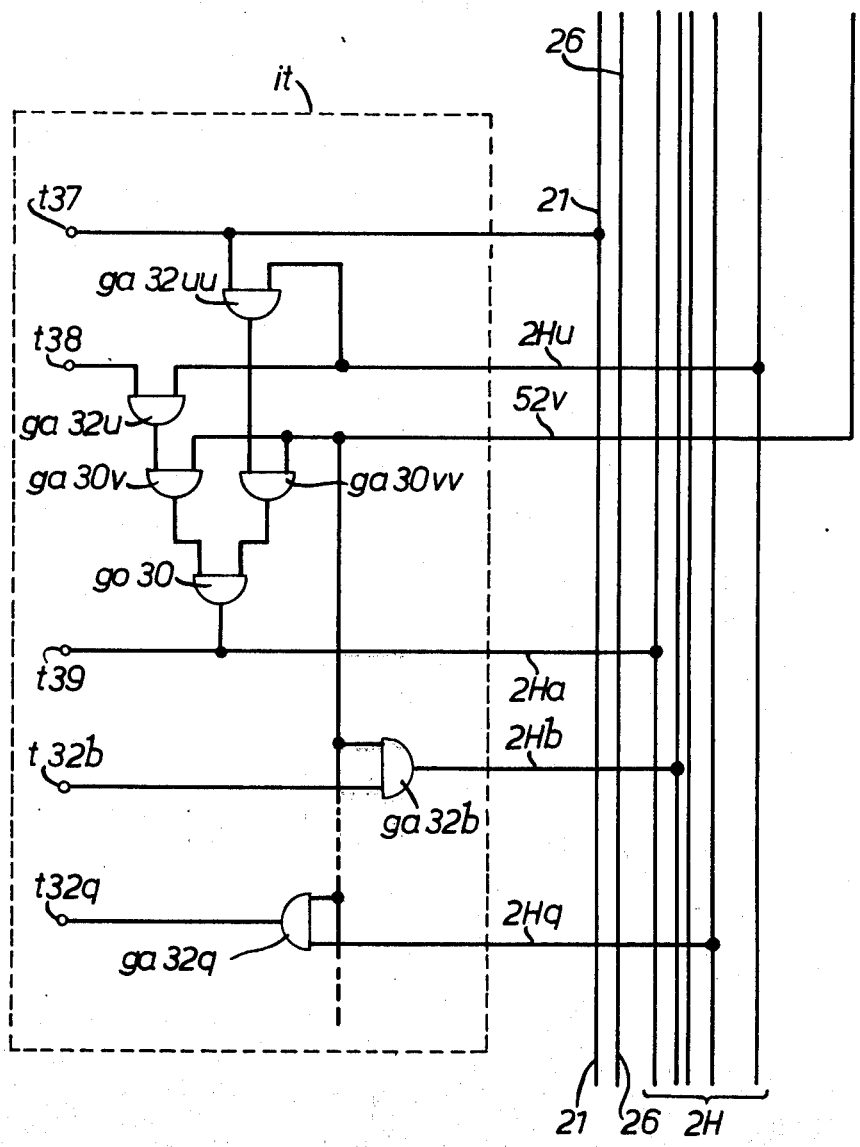
Figure 3:
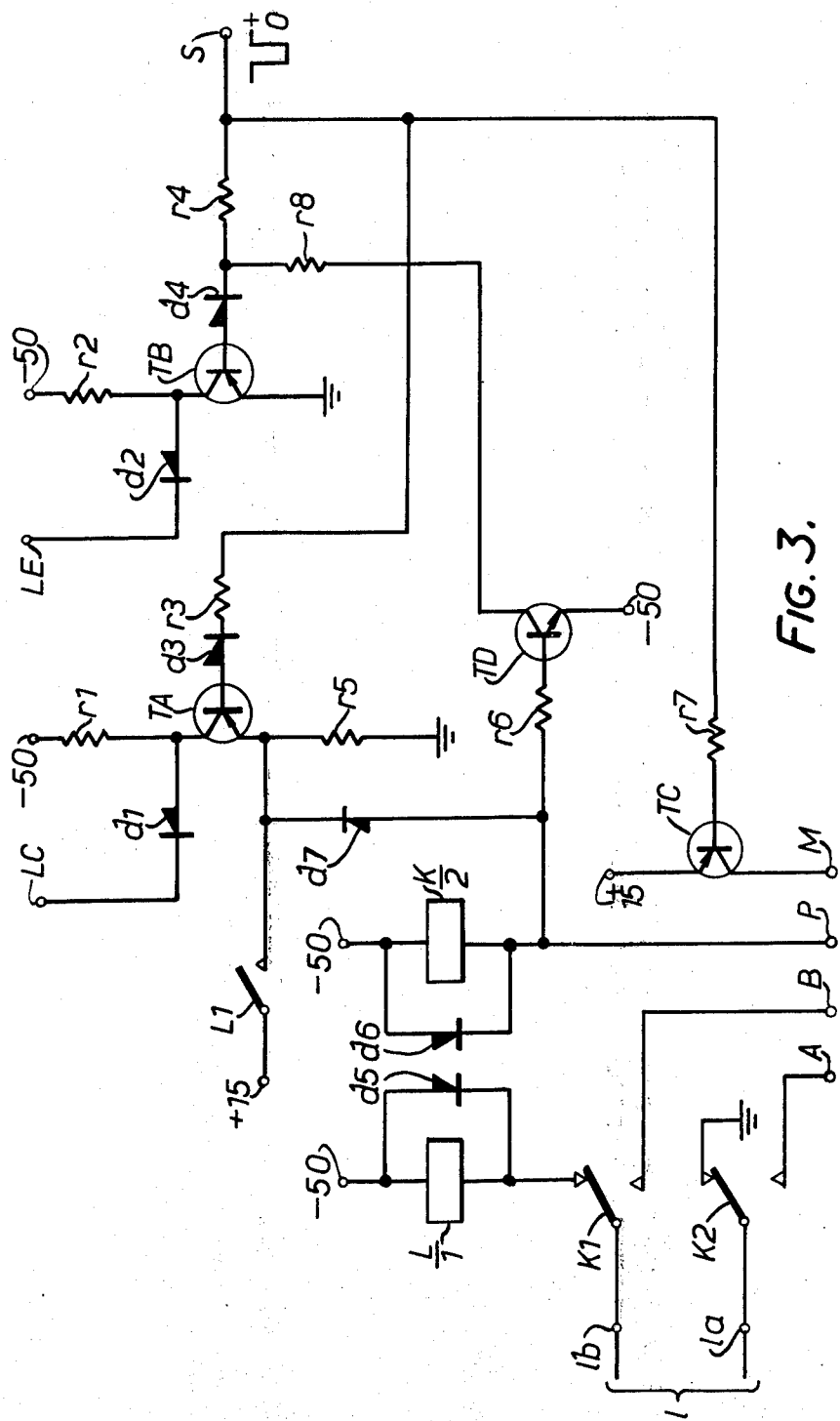
Figure 4:
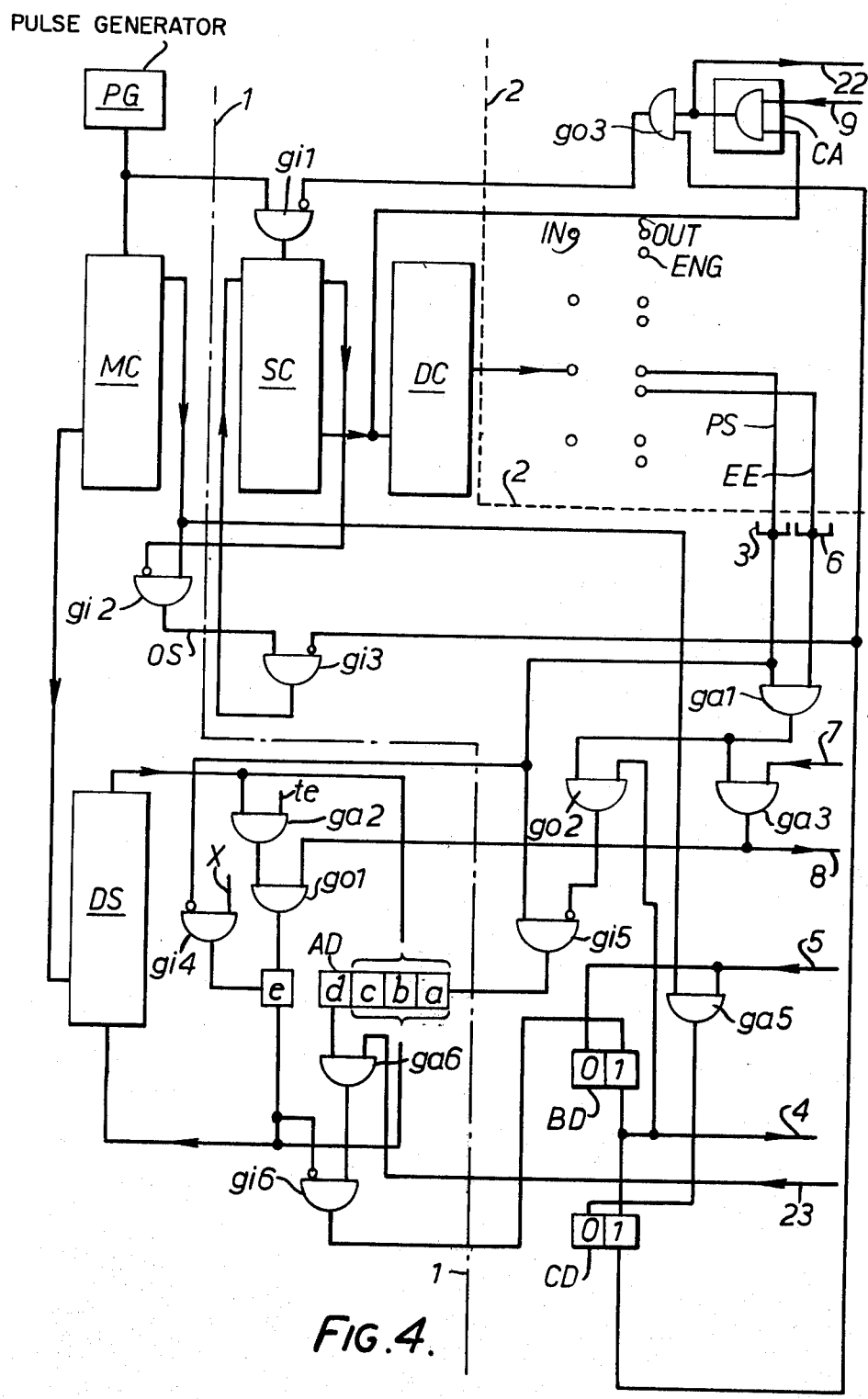
Figure 5:
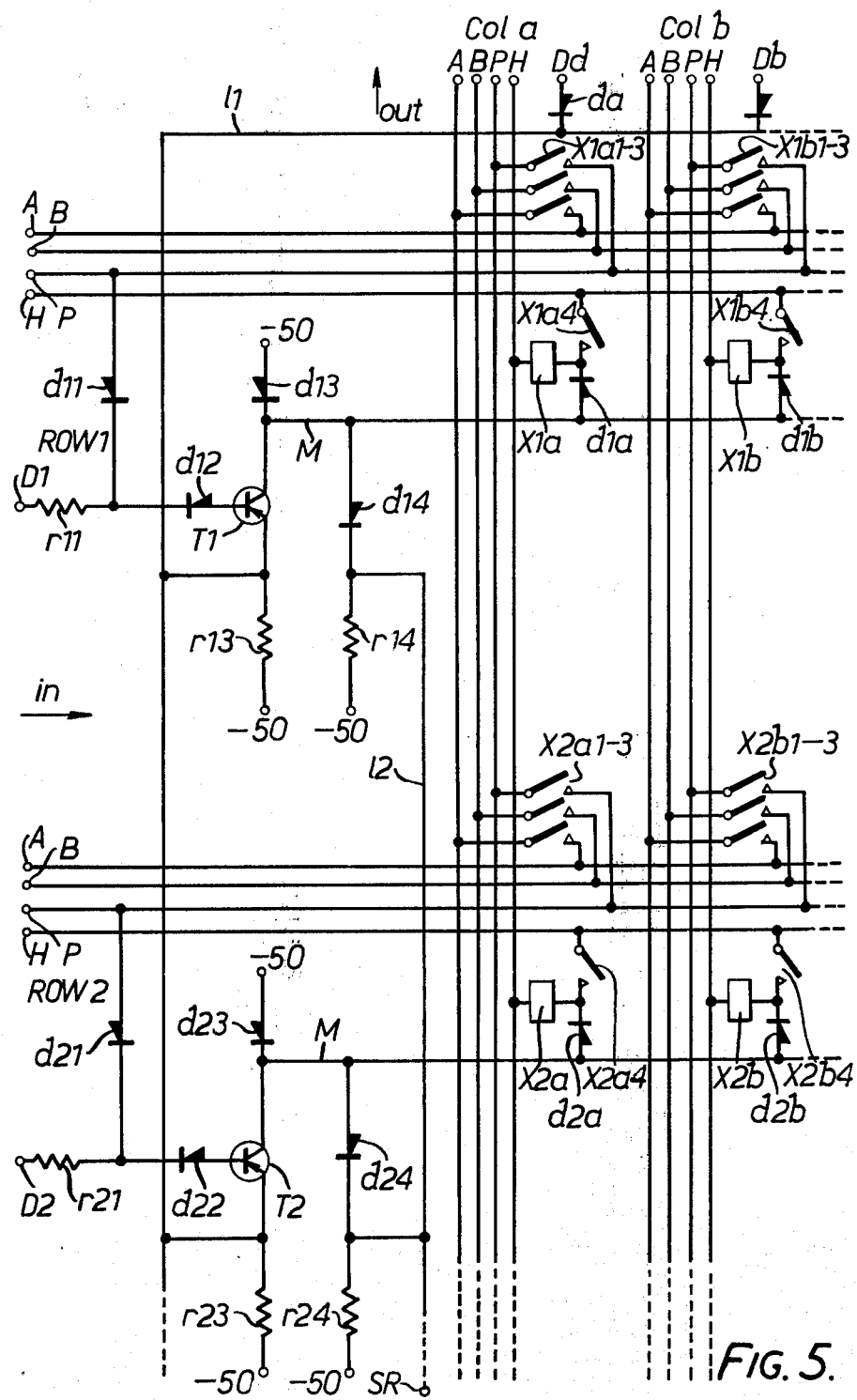
Figure 6:
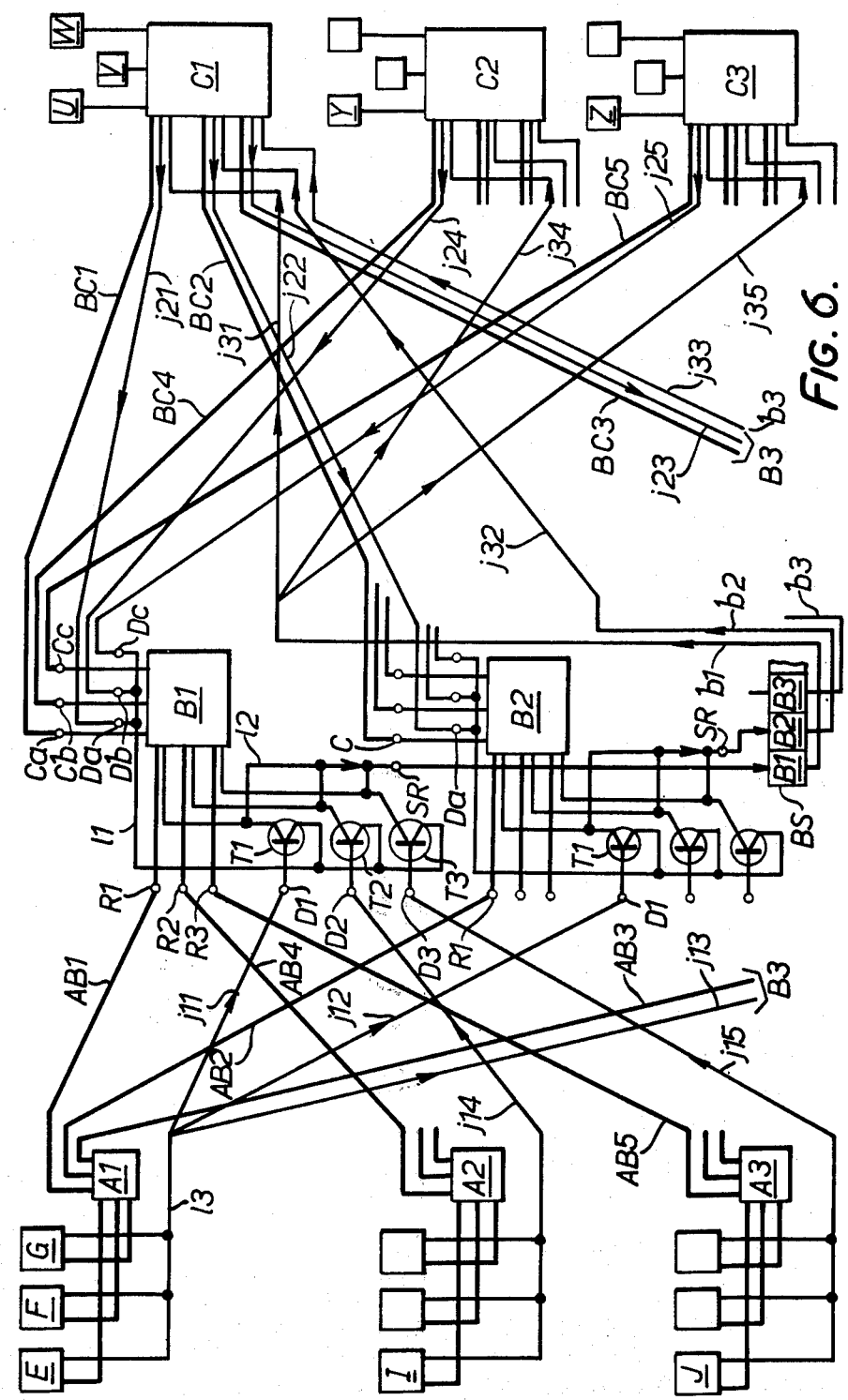
Figure 7:
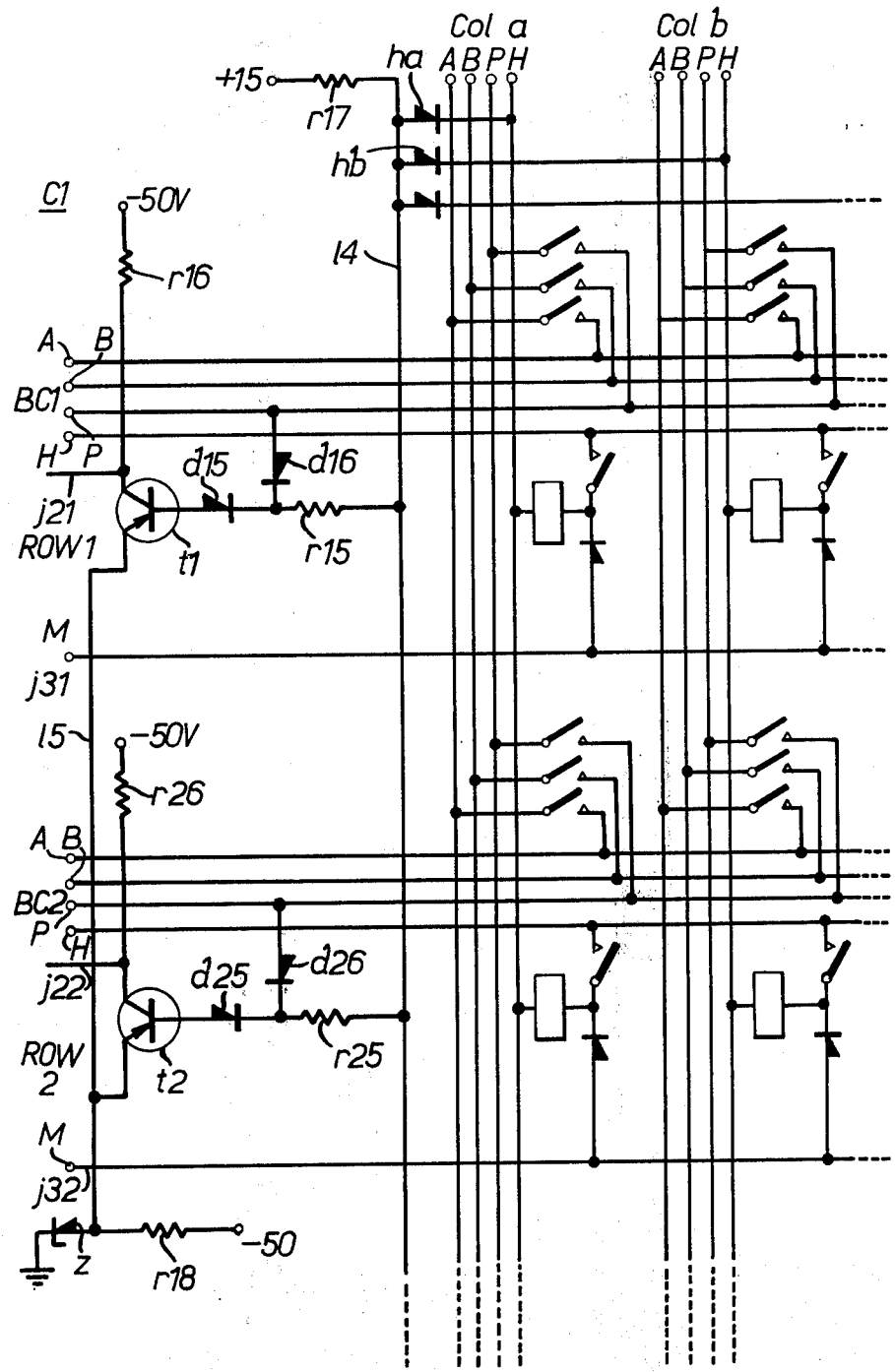
Figure 8:
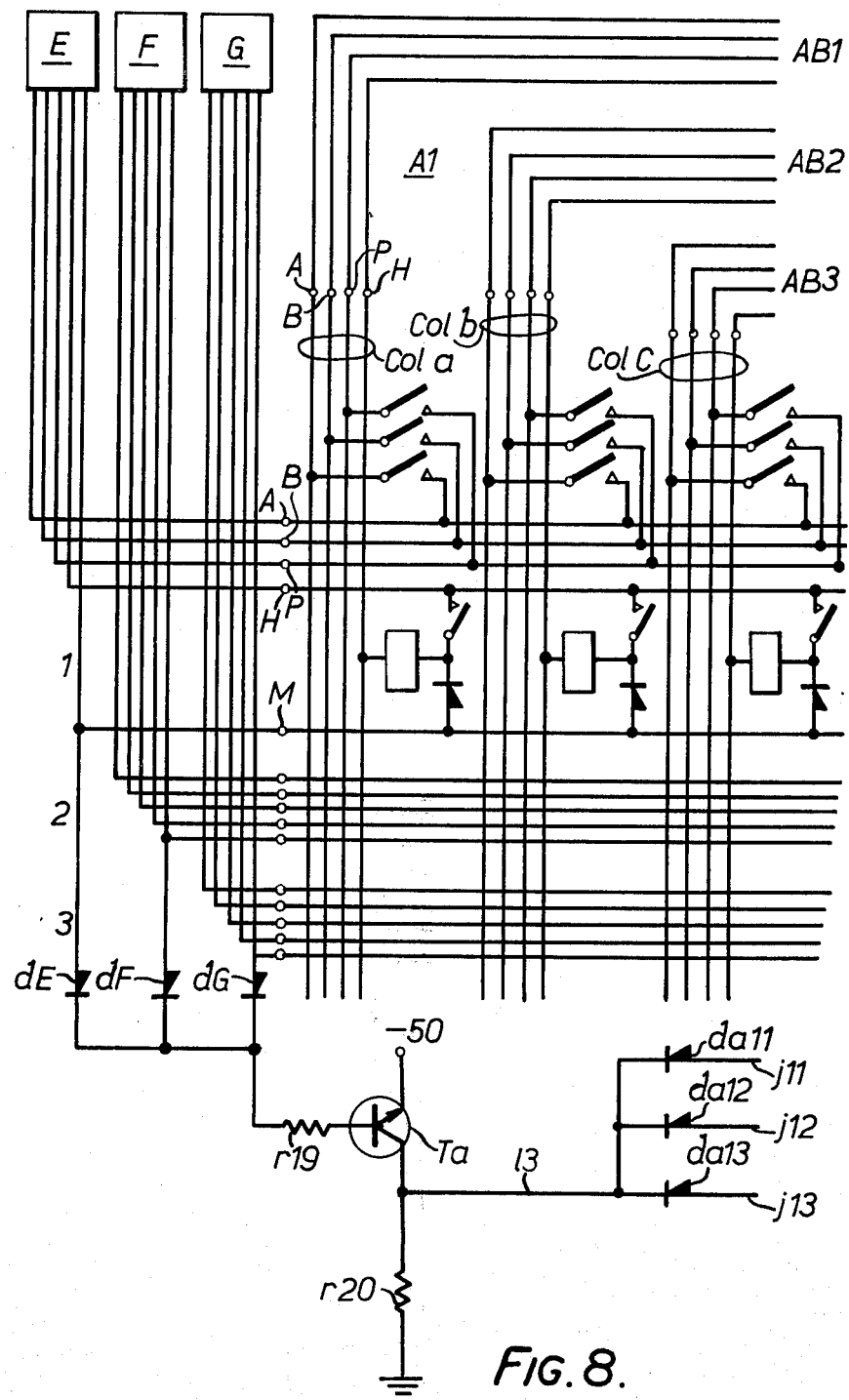

The invention will now be described as applied to a private branch exchange. In order to illustrate the working of the invention, it will be assumed that the exchange has a crosspoint switching network of the type described in British Pat. specification No. 12,976/73; as well as calling signal detection equipment comprising line circuits as disclosed in British Pat. specification No. 12,309/73, and persistence check equipment as disclosed in British Pat. specification No. 16,015/73. During the description reference will be made to the accompanying drawings in which:

FIG. 1 is a schematic diagram illustrating the use of the invention at a private branch exchange as mentioned above, equipment according to the invention appearing to the right of the broken line 10, FIGS. 2a, 2b, 2c, when placed together one above the other, show the right hand part of FIG. 1 in greater detail, FIG. 3 shows a line circuit disclosed in British Pat. specification No. 12,309/73, FIG. 4 shows scanning and persistence check equipment as disclosed in British Pat. specification No. 16,015/73, FIG. 5 shows four crosspoints of a switch disclosed in British Pat. No. 12,976/73, FIG. 6 shows a switching network having A, B, C switching stages, the switch of FIG. 5 being employed in the B stage, FIG. 7 shows four crosspoints of a C-stage switch in the network of FIG. 6, and FIG. 8 shows part of an A-stage switch in the network of FIG. 6.

Figure 9A:
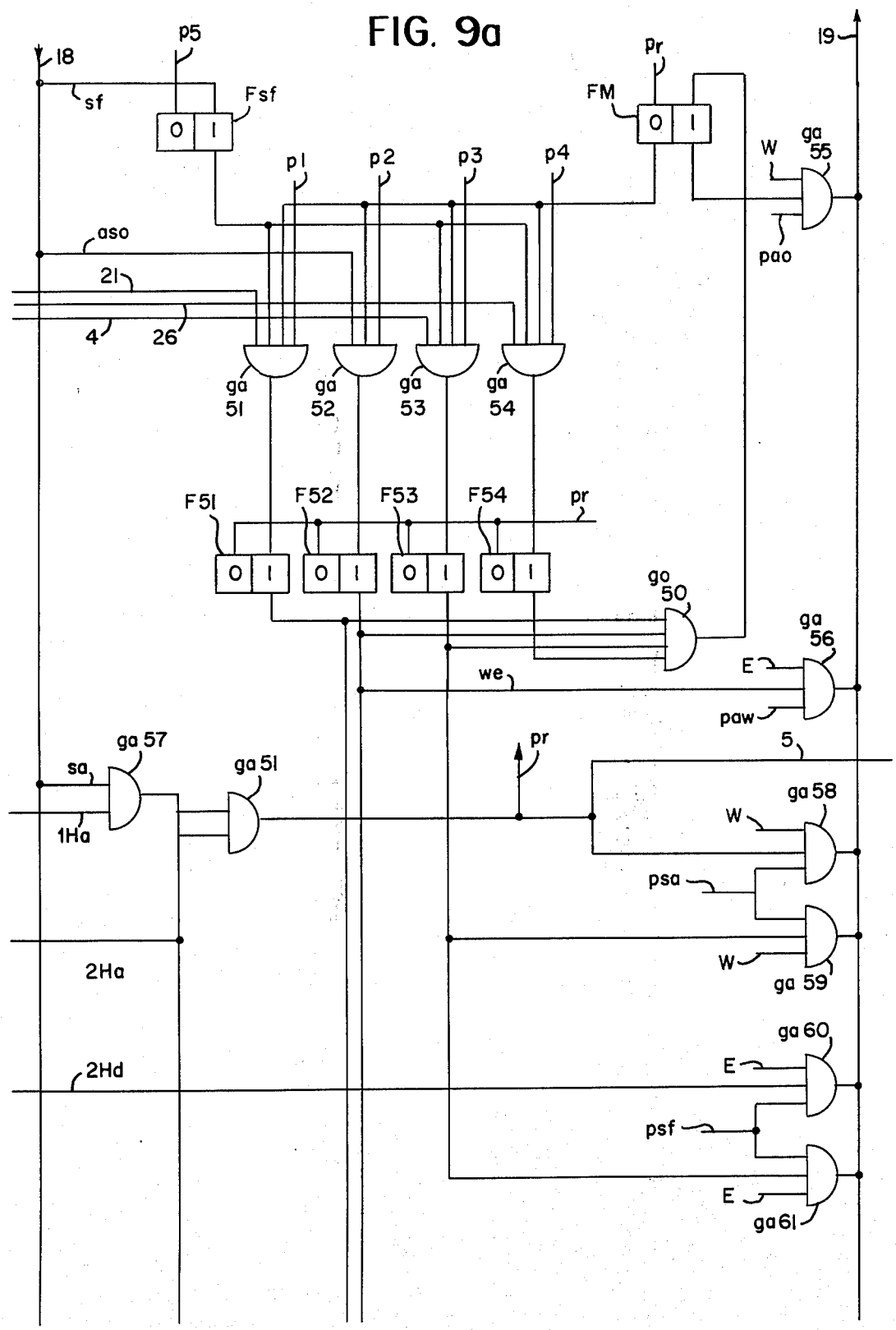
Figure 9B:
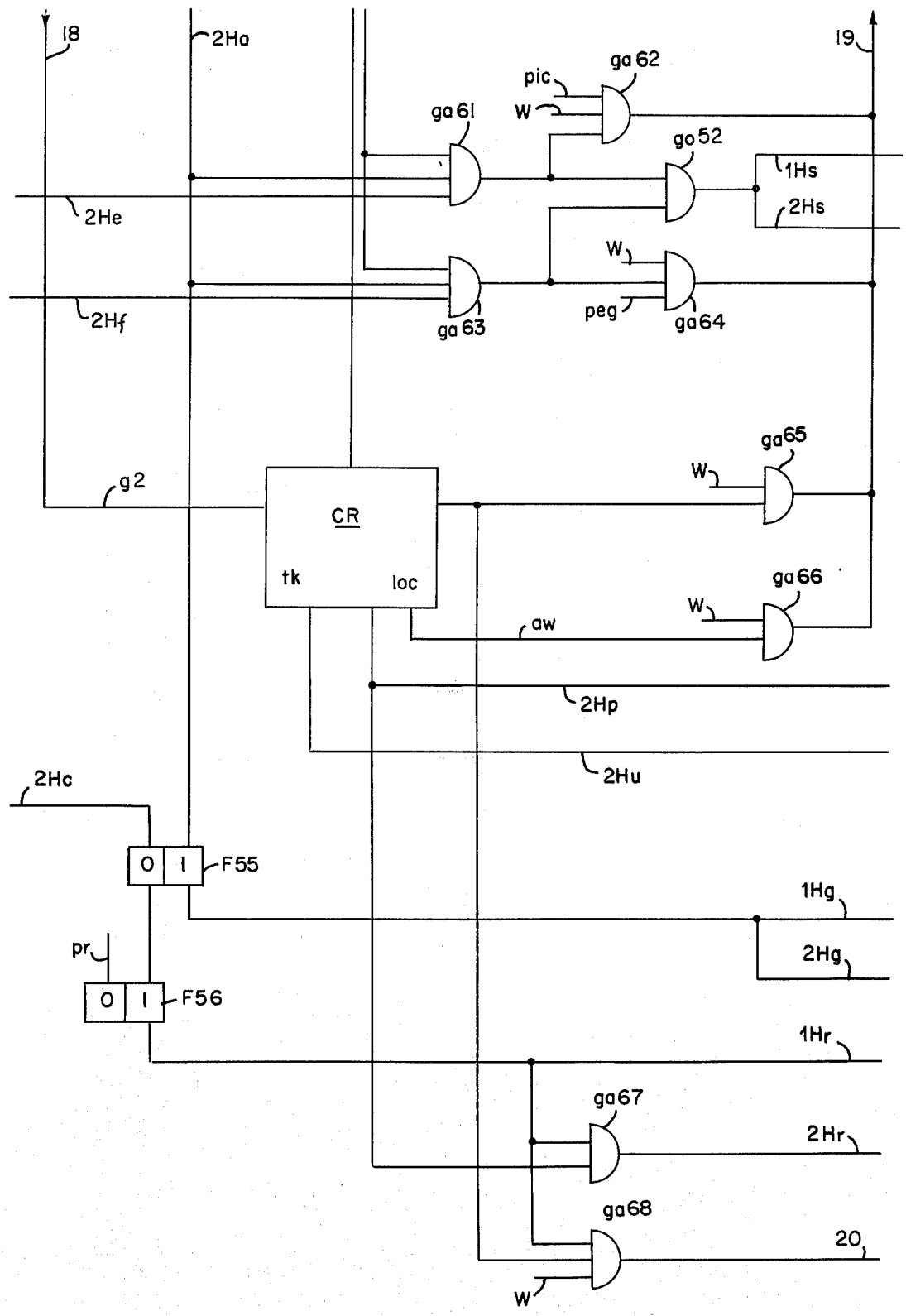

FIGS. 9a, 9b show part of FIG. 2a in greater detail; FIG. 9b should be placed below FIG. 9a.

FIGS. 3–8 are drawings that are included in the specifications mentioned. However, some changes have been made, particularly to avoid duplication of references. Relevant parts of the text of these specifications have been suitably amended, and are included in the later passages of this description.

A. Outline of the Invention

Equipment according to the invention is shown to the right of the broken line 10 in FIG. 1. The equipment includes a register RG, having a number of sections (not shown), each assignable to a call which has to be set up. A register section has a free/busy cell which registers whether the section is available for or has been assigned to a call; a first group of cells in which signals may be registered which indicate stages reached in the process of setting up a call; and a second group of cells in which signals indicating a call's destination are accumulated. When assigned to a call, a register section is initially void of information. A register section serves as a temporary store, and may have any suitable construction. The number of sections in a register is related to the traffic capacity of the exchange at which it is used. The number of cells in the first group of a register section is determined by the circuitry in use at the exchange. The number of cells in the second group is determined by the maximum number of digits to be stored, and by the storage code used. A limited number of further register sections is provided for other purposes, such as enquiry calls and calls to an attendant.

All the sections of the register RG are scanned once in each cycle of a cyclic scanner CS which delivers scanning pulses over a lead S1. When a register section is scanned, information registered therein is read out, and delivered to a logic network LN over lead 18. The logic network LN, which consists of a suitable configuration of coincidence gates and flip-flops, responds to the received information, and returns it, either changed or unchanged depending on circumstances, over lead 19, to the section out of which it was read. Corresponding to each register section, an interface unit is provided. These units are shown at $id$, $iq$, $ik$. Scanning pulses from the scanner CS are delivered to these units over the lead S1. The units $id$, $iq$, $ik$ are connected to the logic network LN by a first signal highway 1H. The delivery of a scanning pulse to an interface unit effectively connects the unit to the highway, and over the highway to the logic network. Since the same scanning pulse is delivered to the register section to which the scanning unit corresponds, the register section is simultaneously connected to the logic network. Such a connection is established once in each cycle in respect of each register section and its corresponding interface unit. In other words, the first highway 1H, and the logic network LN are operated on a time-shared basis.

Each interface unit $id$ is associated with a digit detector DD, whose function is to detect digits dialled, or otherwise signalled, from a calling extension line 1. The scanning of a unit $id$ allows each digit to be passed from the detector DD and registered in the appropriate section of the register RG. The digit detectors DD are a known part of a known exchange, and are constructed so as to be compatible with the means by which a calling extension line indicates a wanted number. The means, for example, may be a dial, or a push-button keyset. At this stage it is convenient to regard a digit detector DD as a staticiser, and an interface unit $id$ as an array of two-input AND gates; each gate has one input which is connected to the detector, and another input which is scanned by the scanner CS, the outlet of the gate being connected to the highway 1H. It will be seen later that the highway 1H is a multi-conductor highway. The interface units $iq$, $ik$ operate similarly to a unit $id$, but are used respectively for enquiry calls and calls set up by means of a keypad $kp$ at an attendant's console AC.

Another known part of the known exchange comprises supervisory sets which supervise the maintenance and release of an established connection. These are of different types, suitable for different types of connection. They are designated by the letter S followed by a second letter indicating the type of connection. Thus the sets SL are used for local (extension-line-to-extension-line) calls, the sets SQ for enquiry calls, the sets ST for calls involving an exchange trunk $tk$ to or from a public exchange, and the sets SA for calls requiring the services of an attendant. The sets are constructed so as to be compatible with the exchange circuitry. In addition, the trunk supervisory sets ST are compatible with the circuitry of a public exchange at which the trunks are terminated. Each of the supervisory sets SL, SQ, ST, SA has a corresponding interface unit $il$, $iq$, $it$, $ia$. Again it is convenient to regard a supervisory set as a staticisor, and an interface unit as an array of two input AND gates. Each gate has one input connected to a supervisory set, the other input being scanned by an interruptable scanner IS over a lead S2. The gate outputs are connected to a second highway 2H. The second highway 2H is terminated at the logic network LN, and is a multi-conductor highway. The scanning by the scanner IS is normally ineffective. When a particular supervisory set is required, an interruption circuit IC is operated, and stops the scanner IS while the wanted set is being scanned. The scanning pulse is thereby prolonged and is used as a priming signal for the gates of the relevant interface unit.

Once the digits of a wanted number have been accumulated in an assigned section of the register RG, the accumulated information is used to select a supervisory set of appropriate type, and to deliver, to the selected set, signals which are instrumental in establishing the desired connection. The second highway 2H is used for this purpose. The second highway 2H is used for one call only at a time. To prevent the highway being used for two calls at the same time, the logic network LN is provided with a master flip-flop (not shown in FIG. 1) which must be switched from a rest to an operated condition before the highway can be used. The flip-flop remains operated as long as the highway 2H is required. When the highway is no longer needed, the flip-flop is restored.

When the desired connection has been established, the maintenance and release of the connection are controlled by the supervisory set in known manner. When the desired connection is established, therefore, the assigned register section is erased, and the free signal is written into the free/busy cell so that the section is made available for other calls.

A temporary store TS is provided to store, for identification purposes, a wanted number which has been read from an assigned section of the register RG. An auxiliary highway $1h$ connects the logic network LN to the interface units $id$, $iq$ which are served by the first highway 1H. The auxiliary highway $1h$ is used for one call only at a time. On certain types of call it is necessary to establish a connection between a trunk supervisory set ST on the one hand, and either a digit detector DD or an enquiry supervisory set SQ on the other hand. Auxiliary crosspoint switches $x1$, $x2$ may be provided for these purposes. Alternatively, the connections may be established through the switches of the switching network $f6$.

B. Outline of Operation

The sections of the register RG and the corresponding interfaces units $id$, $iq$, $ik$, are scanned cyclically by the cyclic scanner CS. At the same time, the interruptable scanner IS runs ineffectively. When a call is originated, a signal is received over a lead 4. A free register section, scanned after the receipt of this signal, is assigned to the call. The assignment of the register section involves the assignment of the corresponding interface unit $id$, and, by means which will be described later, a path is established through the switching network $f6$, which connects the caller to the assigned interface unit. Digits dialled by the caller are detected by a digit detector DD, and, during successive cycles of the scanner CS, are passed by way of the interface unit $id$, the first highway 1H and the logic network LN to the assigned register section. When the call's destination is apparent, a signal is developed in the logic network indicating the type of supervisory set required, the second highway 2H, if available, is seized for exclusive use, and the interruptable scanner is stopped as soon as a free supervisory set of the required type is scanned. If appropriate, the wanted number is transferred to the temporary store TS. Signals requisite to the establishment of the desired connection are developed by the logic network LN and are passed over the second highway 2H to the supervisory set. Eventually the required connection is established. When this occurs, the highway 2H is released, and the assigned register section is erased and released. Maintenance and clear down of the established connection is controlled by the supervisory set in known manner.

The logic network LN can handle a number of calls simultaneously. In any one cycle, a number of the sections may receive signals over the time-shared highway 1H, one section may have exclusive use of the second highway 2H, and other sections may either be awaiting assignment or, having been assigned, may be awaiting an opportunity to use the second highway 2H. Depending on the type of connection required, the second highway may be used more than once during the establishment of one connection.

Digits indicating a call's destination are received at the digit detectors DD, and in certain circumstances at the enquiry supervisorty sets SQ. They may also be generated at the keypad $kp$ of the attendant's console AC. The incidence of these digits is random. To avoid excessive delay and possible loss of signals which are received simultaneously or nearly so, the first highway 1H, to which the interface units $id$, $iq$, $ik$ are connected, is worked on a time-shared basis.

C. Advantages of the Invention

The register RG, the logic network LN, and the interface units $id$-$ik$ may be realised by metal-oxide-silicon transistors accommodated on integrated circuit chips. The highways 1H, $1h$, 2H are merely bundles of conductors. The equipment is compact and easy to manufacture by known methods. By operating the logic network LN on a time-shared basis, the time during which the network is idle is reduced to a minimum. By working the second highway 2H on the basis of exclusive access as and when required, the terminal equipment of the highway 2H is simpler and cheaper that the time-shared equipment of the first highway 1H.

D. The Specimen Exchange

To explain the working of the invention, a specimen exchange is shown in FIG. 1 by way of example. The exchange has a line circuit f3 for each extension line 1. The lines 1 are scanned by line scanning equipment f4, which conducts a persistence check on any calling signal found during the scanning process. When a calling signal is found, the scanning process is interrupted, with the result that a mark signal is sustained at a terminal M of the relevant line circuit f3. At the same time the equipment f4 delivers a signal over lead 4. The exchange also has a switching network f6 comprising three stages of crosspoint switches aa, bb, cc. In FIG. 1, thin lines denote connections used for signals only, and thick lines denote connections which carry speech as well as signals. A path through the switches is established by a bb switch selector BS in response to the coincidence of a first mark signal received from the terminal M of a line circuit f3 and a second mark signal received from a column of a cc switch.

E. The Inter-Relation Between the Invention and the Specimen Exchange

Each of the signal highways 1H, 1h, 2H carry signals of varying significance. Preferably each highway has a conductive path for each signal carried. This facilitates the termination of the conductors at the logic network LN, and, through the interface units, at the digit detectors DD, the supervisory sets SL, SQ, ST, SA and the attendant's console AC. A conductive path may comprise a single conductor, in which case the conductive paths of a highway share a common earth return. Alternatively a conductive path may comprise a balanced pair or a twisted pair as may be desired. However, a conductive path may carry more than one signal if appropriate terminal arrangements are made. In this description, suffixes are appended to the highway references to identify individual signals carried by the highways. The same suffixes are used to identify the relevant pair of conductors in the highway, as well as the relevant gates and terminals of the interface units. The suffixes run from a onwards in respect of signals proceeding towards the logic network LN, and from p onwards in respect of signals proceeding from the logic network LN. Thus the reference " 1Ha" identifies the signal carried by the a pair of conductors of the first highway 1H in the direction towards the logic network LN. For the sake of brevity and clarity, FIGS. 2a, 2b, 2c show only typical conductors, gates and terminals; and for this reason signals may be identified in the text by references which are not shown in the drawings, but whose significance will none the less be meaningful. Also for simplicity, a pair of conductors is shown as a single line and is referred to as "a conductor".

The exchange has supervisory sets of different types. The number of different types depends on the design of the exchange and the number of sets of each type depends on the traffic to be carried by the exchange. Each type of supervisory set has a corresponding type of interface unit, and each set of one type has an individual interface unit of the appropriate type. An interface unit il, which is appropriate to a local supervisory set SL, is shown in FIG. 2b; and an interface unit it, which is appropriate to a trunk supervisory set ST, is shown in FIG. 2c. These interface units have a number of gates which are used in the selection of a free supervisory set, and an array of gates by which signals are transmitted to and from a selected set. The exchange also has digit detectors DD whose design is determined by the design of the exchange, and whose number depends on the traffic to be carried by the exchange. Each digit detector DD has an individual interface unit id. One such unit is shown in FIG. 2b, and comprises an array of gates by which signals are transmitted to or from the detector. All the units have terminals t from each of which a lead may be run to an appropriate part in the circuitry of the associated set or detector. The number of such terminals in any unit is determined by the design of the associated set or detector. The number of terminals also determines the number of gates in an array and the number of conductors in a highway.

Interface units which carry signals whose incidence is random and cannot be controlled — for example signals dialled by a caller — are connected to the first highway 1H. To accept these signals with minimum loss or delay, the highway 1H is worked on a time-shared basis. As shown in FIG. 1, the interface units id, iq, ik are connected to the highway. There is a section in the register RG, and a scanning pulse in the cycle of the scanner CS, individual to each of these units. The cyclic scanner CS is shown as being driven by the pulse generator PG of the equipment f4, but this need not necessarily be so.

The logic network LN comprises an assembly of coincidence gates and flip-flops interconnected in accordance with logical functions to be performed and in conformity with the number of conductors on the signal highways 1H, 1h, 2H. The flip-flops are re-set to zero when the logic network is released after being used in connection with any one call. In connection with a typical call at the specimen exchange, the use of the logic network may be regarded as involving three modes. In the first mode, the logic network is used actively to develop signals whereby a signalling path is established between a calling extension line 1 — or an incoming trunk tk — and a register section. In the second mode, the logic network is used passively to pass dialled digits indicating the call's destination to the register section. Use in the third mode begins when the dialled digits suffice to indicate the call's destination. In the third mode, the logic network is again used actively. In this mode the signals developed in the logic network result in the establishment of the desired speech paths. To prevent confusion between calls, the logic network is arranged to operate in the first and third modes in respect of one call only at a time. This is arranged by means of a master flip-flop FM which must be in the rest or "0" state before operation in first or third mode can begin. While the logic network operates in the first or third mode, the flip-flop FM is maintained in the operated or "1" state. During the passive operation of the second mode, the logic network operates on a time-shared basis in respect of calls, the number of which is limited only by the number of available sections in the register RG. Operation in the second mode is independent of the state of the master flip-flop FM. In other words, at any given moment, the logic network LN may be operating in the second mode in respect of an indeterminate number of calls, and, at the same time, in either the first or the third mode, in respect of one further call.

When one of the indeterminate number of calls, just mentioned, reaches the end of the second mode, the third mode can only begin if and when the logic network LN is available to operate in the third mode. To cater for this condition as well as the conditions described in the previous paragraph, access to the logic network is controlled by a number of AND gates, of which four are shown as typical at ga51-ga54. These gates are pulsed in a sequence of descending priority by pulses p1, p2, p3, p4 developed within the logic network. There is a gate corresponding to each pulse of the sequence, and a pulse corresponding to each grade of priority that is considered desirable. For simplicity, only three grades of priority will be considered in detail.

In respect of any one call, access to the logic network LN is normally required on two occasions; the first occasion being for the assignment of a register section to the call; and the second occasion being when digits accumulated in the register section suffice to indicate the call's destination. The first occasion is heralded by the appearance of a signal on lead 4 in respect of a originating cell, or on lead 21 in respect of an incoming cell. The second occasion is heralded by the development of an "access wanted" signal aw when the digits read from a scanned register section suffice to indicate the call's destination. Once developed, the signal aw is registered in a cell in group g1 of the register section, and is read out when the section is next scanned.

In order to give incoming calls first priority, the lead 21 is taken to the gate ga51 which is pulsed by the first pulse p1 of the sequence of pulses. The signals aw are afforded second priority, and are applied to the gate ga52 which is pulsed by the pulse p2. Lead 4 is taken to the third gate ga53 which is pulsed by the pulse p3. A lead 26, which is used for any suitable purpose, is taken to the gate ga54 which is pulsed by the pulse p4. All the gates receive an input when the master flip-flop FM is in the "0" state. When a register section is scanned, a "section free" signal sf is read out if the section has not been assigned to a call. The signal sf is applied to the gate ga51 for use with incoming calls, and to the gate ga53 for use with originating calls. A section which develops an aw signal cannot be free: for this reason the sf signal is not applied to gate ga52. Since the sf signal is required at the times of the three pulses p1, p3, p4, the signal read from the register is staticised in a flip-flop Fsf, which is restored by a convenient pulse after p4, say p5.

Corresponding to each of the gates ga51-ga54 is a flip-flop F51-F54 which is operated when the relevant gate opens. The switching of any one of these flip-flops opens an OR gate go50 and operates the master flip-flop FM. The pulses p1–p4 may be developed in any suitable way, but they must be separated in time by an interval sufficient for the master flip-flop FM to be operated in response to a pulse of one priority, before a pulse is applied to the gate of the next lower priority. The operation of the master flip-flop FM terminates the signal on lead 23, and disables a gate ga6 in the line scanning equipment f6. While the gate ga6 is disabled, no further signal can appear on lead 4. With the master flip-flop FM operated, an access obtained signal ao is written into a cell in group g 1 of the register section concerned. This signal is used to identify the section, if and when required, during subsequent cycles of the scanner CS.

With any of the flip flops F51-F54 operated, signals are available in the logic network LN for use as may be required. In particular, the operation of the flip-flop F52 develops a signal we which is used to erase the aw signal from the register section concerned. When the logic network LN is no longer needed for operation in the first or third mode, the flip-flops FM, F51-F54 are restored by a common restore pulse pr, and the ao signal is erased from the register section concerned. It is important to note that the time for which the flip-flops F51-F54 can be held operated is independent of the duration of the scanning pulses S1. This independence permits signals derived from the flip-flops to have a duration suited to the apparatus which they have to control.

In the register RG, a section comprises a cell cf in which the free/busy condition of the section is registered; a first group g 1 of cells for registering signals relating to the setting-up of a call, including a cell ca in which the access-obtained signal ao is registered; and a second group g 2 of cells in which the digits of a wanted number are registered. When a wanted number has been registered in the second group of cells, it may be transferred to the temporary store TS, whence signals are applied over a lead 9 to a comparator CA in the line scanning equipment f4. As an alternative to the use of a comparator, a circuit which overrides the free running of the scanner may be used instead.

F. The Invention and the Specimen Exchange Awaiting Use

When the invention and the exchange are awaiting use, the pulse generator PG in the scanning equipment f4 is running, and the line circuits f3 are scanned in turn. The cyclic scanner CS scans the sections of the register RG simultaneously with the corresponding interface units id, iq, ik which are connected to the first highway 1H. In each register section, the cell cf registers the free signal, and the remaining cells are void of information. The interruptable scanner IS scans ineffectively the interface unitis il, iq, it, ia which are connected to the second highway 2H. The master flip-flop FM is in the rest or 0 state.

G. Operation of the Invention and the Specimen Exchange

For ease of reference the operation will be described in numbered steps with reference to typical calls. Details of the logic network LN, which are not shown in FIG. 2a will be found in FIGS. 9a, 9b.

a. Originating call

Step 1 When an extension line l originates a call, this is detected when the relevant line circuit f3 is scanned. If the calling condition persists, the scanning of the line circuits is interrupted, with two results. Firstly, a mark signal is delivered from the terminal M of the line circuit f3 to the switching equipment f6. Secondly, a signal is delivered from the scanning equipment f4, over lead 4, to the logic network LN.

Step 2 In the logic network LN, the signal on lead 4 is applied to the gate ga53. If a scanned register section is free, the signal sf appears, via the flip-flop Fsf, at the gate ga53. If the master flip-flop FM is in the 0 state, there is a further signal present at the gate ga53. The pulses p1, p2, p3 are applied to the respective gates each time a register section is scanned. If the pulses p1, p2 of a sequence are ineffective, and if the three signals just mentioned are present at the gate ga53, the appearance of the pulse p3 opens the gate ga53. This is followed by the switching of the flip-flop F53, the opening of OR gate go50 and the switching of the master flip-flop FM. With the flip-flop FM operated, the gates ga51-ga54 are disabled. The output of flip-flop F53 is applied to a gate ga61 where it is used, in conjunction with an erase pulse E and a suitable strobe pulse psf to erase the "section free" signal sf of the scanned section, thereby assigning the scanned register section to the call. The assigning of a register section to the call is tantamount to assigning to the call the scanning pulse, say S1a, appropriate to the section, and the interface unit id which corresponds to the section. The output of flip-flop F53 is also applied to a gate ga 59 where it is used, in conjunction with a write pulse W and a strobe pulse psa, to develop a "section assigned" signal sa, which is written into a cell of group g1 of the section, and is read out at the next scanning. The signal read out is applied to the conductor 1Hp, causing the gate ga1p in the relevant interface unit id to open. From the terminal t1p, a signal is delivered to the associated digit detector DD, where it is used to apply a mark signal to lead 11. The switching network thus has two mark signals being applied to it, namely one from the terminal M of the caller's line circuit f3 as described in Step 1, and another over the lead 11. The switching network responds by setting up a speech path which connects the calling line to the digit detector DD. Although suitable for speech, this path is used only for signalling. When the path has been established, the digit detector DD terminates the mark signal on lead 11 and delivers a confirmation signal at the terminal t1a of the interface unit id. At the next appearance of the scanning pulse S1a, the gate ga1a opens, applying to conductor 1Ha a signal, which is received by the logic network. In the logic network, the signal is applied to a gate ga 57 where it is used to develop a pulse pr, to apply a signal to the lead 5, and to erase the signal sa from the register section. The pulse pr restores the flip-flops FM, F51-F54. The signal on lead 5 allows the scanning of the extension lines to resume, and terminates the mark signal delivered by the caller's line circuit. Throughout Step 2, the logic network operates in the first mode.

Step 3 In Step 3 the logic network operates in the second mode. Digits, dialled or keyed by the caller, reach the digit detector DD through the switching network f3, using the path set up in Step 2. The digit detector detects each digit in turn, and applies correponding signals to terminals t1b, etc. When the scanning pulse S1a appears, these signals are passed by conductors 1Hb etc and the logic network to the assigned register section, each digit is passed in turn to the assigned section, and is registered therein. During successive scannings, the digits of the wanted number are accumulated. At each scanning, the digits so far accumulated are read out to the logic network, where they are compared in a comparator CR with permanently recorded routing information. Whe the digits read out suffice to identify the call' destination, an "access wanted" signal aw is developed in the logic network. The signal aw is registered in the register section, and is read out at the next scanning.

Step 4 In step 4, the operation of the logic network changes from the second to the third mode. At each scanning of the register section, the signal aw is presented to the gate ga52 of the logic network. When the master flip-flop FM is in the 0 state and the pulse p2 is present, the gate ga52 opens, operating the flip-flops F52, FM. With the flip-flop F52 operated, an "access obtained" signal ao is developed at the gate ga55, the access wanted signal aw. being erased by the opening of the gate ga 56. At the next scanning of the register section, the accumulated digits are again read out. Signals are developed by the comparator CR in the logic network LN which depend on the significance of the digits and which determine the course of subsequent events.

b. Another Extension Wanted

Step 5 If the digits read from the register section indicate that another extension line is wanted, the logic network LN develops a signal indicating that a local supervisory set SL is required. This signal is applied to conductor 2Hp (the master flip-flop FM having been operated in Step 4). The local supervisory sets SL, when not in use, deliver a free signal at terminal t28 of the associated interface unit il. Therefore, at the units associated with free sets, the gates ga22p Sopen, and at the first of these units to be scanned, say by the pulse S2a, the gate ga20s opens. The opening of the gate ga20s develops two signals: the first is applied to the terminal t29 and causes the supervisory set to terminate the free signal at terminal t28: the second is applied to the conductor 2Ha for delivery to the logic network,, and by the lead 13, to the interruption circuit IC. The interruption circuit IC responds by interrupting the scanner IS, with the result that the scanning pulse S2S is prolonged into a static signal which primes the (typical) gates ga22b, ga22g in the interface unit concerned. The response of the logic network to the signal on conductor 2Ha is to operate a flip-flop F55 which applies a signal to each of the conductors 1Hq, (not shown) and 2Hq, The digit detector DD responds to the signal on conductor 1Hq by applying a signal to the P-wire (not shown) of the path set up in Step 2. This signal is received by the caller's line circuit, and reinstates a mark signal at the terminal M. At the interface unit il whose gates are primed by the prolonged scanning pulse S2a, the signal on the conductor 2Hq is passed by the gate ga22q and terminal t22q to the associated local supervisory set SL. The set responds by applying a mark signal over lead 14. In response to the two mark signals, a spech path is set up which connects the caller to the local supervisory set. When the path has been established, the supervisory set delivers a confirmation signal over conductor 2Hc (not shown) to the logic network. This restores the flip-flops F55 and operates P56 with a three-fold effect. Firstly, a signal is applied to the conductor 1Hr (not shown) which causes the digit detector DD to release the path set up in Step 2 and used in Step 3 for the conveyance of dialled (or keyed) digits. Secondly, a signal is applied to the conductor 2Hr (not shown), which, through a gate ga 67, causes the supervisory set SL to deliver a mark signal over lead 15. Thirdly, the wanted number is read from the register section, and passed via the gate GA 68 and the lead 20 to the temporary store TS. By means of the lead 9, the line scanning equipment f3 is interrupted when the wanted extension line is scanned. The interruption of the scanning produces a mark signal at the terminal M of the line circuit f3 appropriate to the wanted extension line. At this stage there are two mark signals being presented to the switching network f6. The switching network responds by setting up a speech path between the supervisory set SL and the wanted extension line. When the path has been established, the supervisory set SL performs two functions. The first function is to complete the call by connecting the two paths in tandem, the completed connection being: calling extension - switches *aa, bb, c* - lead 14 - local supervisory set SL - lead 15 - switches *cc, bb, aa* - wanted extension. Once the two paths have been connected in tandem, the set takes over supervision of the call, maintaining and eventually releasing the established connection in the well known way. The second function is to develop a release signal which is passed over the conductor 2H*d* (not shown) to the logic network. Here it is used, firstly, as an erase signal to erase the information in the temporary store TS and in the register section; and secondly, as a release signal which both develops the pulse *pr* to restore the flip-flops F52, FM, and writes the section free signal *sf* in the appropriate cell of the register section.

c. Public exchange wanted

Step 6 Step 6 follows step 4 if the digits read from the register section indicate that the public exchange is wanted. When such digits are read out, the logic network LN develops a signal indicating that a call over an exchange trunk *tk* is involved. This signal is applied to conductor 2H*u*. In the interface unit it which is scanned, say, by the pulse S2*b*, the gates *ga*22*u, ga 30v* operate in the manner described in Step 5 in respect of the gates GA22P, *ga*22*p, ga*20*s* of the interfacae unit il. Additionally an OR gate *go*30 is opened. As before, the scanning pulse is prolonged, priming the (typical) gates *ga*32*b, ga*30*q*. As before, the response of the logic network to the signal on conductor 2H*a* is to apply signals to conductors 1H*q*, 2H*q*. The latter is picked up by the trunk interface unit it, where gate *ga*32*q* opens. As a result, a speech path is established in the switching network *f*6 between the calling extension line and the trunk supervisory set ST associated with the interface unit it. The set then connects the path in tandem with the exchange trunk *tk* which terminates at the set. The set assumes supervision of the connection. The caller continues to dial, the digits being passed over the path and trunk *tk* to a register in the public exchange. The events of Step 6 take place during an inter digit pause.

d. Attendant wanted

Step 7 Step 7 follows step 4 if the digits read from the register section indicated that the atatendant is wanted. In a manner similar to step 6, an attendant'is supervisory set SA is selected, a thereto is set up in the switching network *f*6, and is extended to the attendant 's console AC.

e. Call originated by the attendant

Step 8 It will be recollected that there is a register section individual to the interface unit *ik*. The attendant signals the wanted number into this section over the highway 1H. If the wanted number is the number of an extension line 1, the call is established by using a supervisory set SA. If an exchange trunk *tk* is wanted, a trunk supervisory set ST and a link 16 are used. The procedure follows the relevant passages in the description of Steps 2–7.

f. Incoming call (Manual)

Step 9 An incoming call is detected at the trunk supervisory set ST at which the relevant exchange trunk *tk* is terminated. On receipt, the call is extended over lead 16 to the attendant, who signals the number of the wanted extension line by means of the keypad *kp* Subsequent events are as described in Step 8.

g. Incoming Call (Automatic)

Step 10 When the facility is granted of allowing callers from the public exchange to dail the numbers of the wanted extension lines 1, it is customary for the trunk supervisory sets ST to be unidirectional. The interface unit *it*, however, can cater for both directions of working. On receipt of an incoming call, the free signal at terminal *t*38 is terminated, and a calling signal is applied to the terminal *t*37. A confirmatory signal is also applied to a terminal *t*32*e* (not shown, but which is arranged similarly to the terminal *ga*32*b*). The calling signal primes a gate *ga*32*ww* in the interface unit it, and is passed to the logic network LN over a lead 21, where it is applied to the gate *ga*51. If the master flip-flop FM is in the O state, the gate *ga*51 opens when a free register section is scanned, operating the flip-flop F51. With the flip-flop F51 operated, two signals are developed. The first signal is used in the manner described in Step 2, to erase the section free signal *sf* from the scanned register, and to write a section assigned signal *sa* therein. The second signal is applied to the conductor 2*hu*, causing the gate *ga*32*ww* in the interface unit it to open, and thereby priming the gate *ga*30*vv*. Eventually, the scanning pulse S2*v* appears at the interface unit *it*, opening the gate *ga*30*vv* and the OR gate *go*30. The opening of the OR gate *go*30 brings about the prolonging of the scanning pulse S2*v*, as described in Step 5 in connection with a local interface unit il. In the interface unit it, the prolonging of the pulse S2*v* opens the gate *ga*32*e* (not shown) which is primed by the confirmatory signal at the terminal *t*32*e*, delivering a signal on conductor 2H*e*. In the logic network LN, the signal on conductor 2H*a* is gated at the gate GA61 with the signal on conductor 2H*e*, giving rise to a signal which is applied to the conductors 1H*s*, 2H*s* (not shown), and is registered in the register section as an "incoming" signal *ic* by means of the gate *ga*62. At the interface unit it, the signal opens a gate *ga*32*s* (not shown, but similar to the gate *ga*32*g*) delivering a signal at the terminal *t*32*s* (not shown). The associated trunk supervisory set ST responds to this signal by applying a mark signal to a column of the switch *x*l. At the relevant interface unit *id*, the signal is passed to the associated digit detector DD, where it is used to mark a row of the auxiliary switch *x*l. (This process is similar to the marking of lead 11 as described in Step 2.) The switch *x*1 responds to the two mark signals and connects the digit detector DD to the trunk supervisory set ST. The set ST responds by connecting the trunk *tk* in tandem with the switch *x*1. The events just described take place during an inter-digit pause. Digits dialled subsequently by the caller are registered in the assigned register section using the route: exchange trunk tk, set St, switch *x*1, digit detector DD, unit *id*, highway 1H, logic network LN, lead 19.

Step 11 Step 11 is similar to Steps 4, 5 if an extension line is wanted, or to Steps 4, 7 if the attendant is wanted. The auxiliary switch *x*1 is released when the desired connection is established. When an extension line is wanted, the complete connection is: exchange trunk tk, trunk supervisory set ST, switches *cc, bb, aa*, line circuit *f*3, wanted extension line 1. When the attendant is wanted, the completed connection is: exchange trunk *tk*, trunk supervisory set ST, lead 16, attendant's console AC. In both instances the completed connection is supervised by the set ST in known manner.

h. Enquiry call

Step 12 When a call has been set up from an incoming trunk *tk* to an extension line 1, it may be desired to originate an enquiry call from the extension line without releasing the incoming call. Such a call is initiated by operating a push-button at the extension instrument. The trunk supervisory set ST, which is in use for the incoming call, maintains a loop, in known manner, across the trunk *tk*. At the same time, the set delivers two signals to the associated interface unit *it*. The first signal is the reapplication of the calling signal at the terminal *t37*. The second signal is a confirmatory signal which applied to ther terminal *t32f*. The first signal is passed by the lead 21 to the logic network LN.

Step 13 In due course the gate *ga*51, in the logic network LN, opens and operates the flip-flops F51, FM, with the results described in Step 10. When the scanning pulse S2*v* appears at the interface unit *it*, the gates *ga*30*vv*. *go*30 open and bring about the prolonging of the scanning pulse, also as described. However, since, with an enquiry call, the confirmatory signal primes the gate *ga*32*f*. a signal is applied to the conductor 2H*f*. In the logic network LN, the signals on the conductors 2H*a*, 2H*f* are gated together at the gate *ga*63, giving rise to a signal which is applied to the conductors 1H*s*, 2H*g*, and is registered in the register section as an "enquiry" signal eq. At the relevant interface units *id*, *it*, IT, the signals on conductors 1H*s*, 2H*s* cause mark signals to be applied to the auxiliary switch *x*1, which responds and connects the set ST to the digit detector DD.

Step 14 The enquiring extension now dials the number of the extension to which the enquiry is to be directed, using the route: the connection through the switches *aa*, *bb*, *cc* originally set up for the incoming call, the set ST used for the incoming call, the switch *x*1, the digit detector DD, the highway 1H, the logic network LN, and the lead 19 to the assigned register section.

Step 15 On conclusion of dialling, the access wanted signal *aw* is developed as described in Step 4. However, the enquiry signal *eq* is read from the register section each time the *aw* signal is read out. In response to these two signals, an enquiry supervisory set SQ is selected, in the manner described for the selection of a local supervisory set SL in Step 5. The number of the wanted extension is passed to the temporary store TS, causing the line circuit *f*3 of the wanted extension to be marked; in response to signals received over the highway 2H, the set SQ delivers a mark signal over lead 24, causing a first path to be established in the switching network *f*6; and in response to further signals over the highway 2H, the set SQ delivers a mark signal over lead 25: all in a manner similar to Step 5. Also, the set SQ delivers a signal which marks a row of the switch *x*2.

Step 16 At the time when a mark signal is applied over lead 25 (Step 15), a signal is developed in the logic network which causes a mark signal to appear at the line circuit *f*3 of the enquiring extension. This signal is routed from the logic network LN to the trunk supervisory set ST by way of the first highway 1H, the digit detector DD and the switch *x*1, which was operated in Step 13. This route is necessary because the highway 2H is already in use in connection with the set SQ. From the set ST, the signal is passed to the enquiring extension over the P-wire (not shown) of the connection which was set up as part of the incoming call. The resultant mark signal co-operates with the mark signal applied to lead 25 in Step 15 and causes a second path to be established in the switching network *f*6. The set ST released the path through the switching network *f*6 which was used for the incoming call. Further, the set ST marks a column of the switch *x*2 which operates and connects the set ST to the set SQ which was selected in Step 15.

Step 17 The enquiry supervisory set SQ connects in tandem the first and second paths mentioned respectively in Steps 15, 16, so establishing the enquiry call. The set SQ maintains and eventually releases the enqiry call in known manner. When the enquiry call is established, the switch *x*, is released, and the assigned register section is erased and released. The switch *x*2 is held, so that a connection to the trunk supervisory set ST is available when the enquiry call terminates and the incoming call has to be re-established.

Step 18 The enquiry call is terminated in known manner by the operation of a push-button at the enquiring extension's instrument. However, before the enquiry call is cleared, the enquiry supervisory set SQ applies a signal to the P-wire (not shown) of lead 25, causing a mark signal to be delivered at the line circuit *f*3 of the enquiring extension. At the same time, the set SQ sends a signal, by way of the switch *x*2, to the trunk supervisory set ST which is in use for the incoming call. The set ST responds by marking a *cc* switch. The switching network responds by setting up a path which re-connects the enquiring extension to the set ST and thence to the trunk *tk*. When the reconnection has been effected, the set ST passes a release signal, by way of the switch *x*2, to the set SQ. The set SQ responds by clearing the enquiry call and releasing the switch *x*2.

Step 19 Step 19 is an alternative to Step 18 and applies if the handset at the enquiring extension is replaced. In these circumstances, the set SQ applies a signal to the P-wire (not shown) of lead 24 instead of lead 25. As a result, the incoming call is transferred to the extension to which the enquiry was directed.

Step 20 The call over the exchange trunk *tk* is eventually cleared by the trunk supervisory set ST in the well known way.

i. Calls on tie-lines

Tie-lines to and from other private branch exchanges are terminated at trunk supervisory sets ST. Calls on tie-lines are dealt with in the manner described for calls using exchange trunks *tk*.

H. The Line Circuit

Referring now to FIG. 3, the line circuit has two inlet terminals *a*, *b*, four outlet terminals A, B, P, M, two signalling terminals LC, LE and a scanning terminal S. The subscriber's line with which the line is associated is connected to the inlet terminals *a*, *b*. The outlet terminals A, B, P, M, give access to and from the switching network of the exchange. Conveniently but not necessarily, conductors connected to the outlet terminals serve as column conductors of a crosspoint switch, a different subscriber being connected to each column of the switch. The signalling terminal LC is connected to a persistence check circuit of suitable construction. The signalling terminal LE is connected to such points in the exchange as may be desired.

In the exchange a pulse generator generates a recurrent cycle of scanning pulses. Each subscriber's line is permanently allotted one scanning pulse of the cycle. This pulse is applied to the scanning terminal once in each cycle. Thus the scanning pulse appropriate to the line 1 is applied to the terminal S.

The scanning terminal S is connected to the bases of three transistors TA, TB, TC through resistor *r*3 and diode d3; resistor r4 and diode d4; and resistor r7 respectively. The transistors are normally non-conductive. The inlet terminals 1a, 1b are connected respectively to earth and to a line relay L in series with a negative supply over unoperated change-over contacts K2, K1 of a cut-off relay K. The cut-off relay K is connected between the outlet terminal P and a negative supply. The relays L, K are shunted by quench diodes d5, d6. The terminal P is also connected by a resistor r6 to the base of a further transistor TD, whose emitter is connected to a negative supply. The collector of the transistor TD is connected by the diode d4 to the base of the transistor TB. The emitter of the transistor TA is connected firstly to earth by a resistor r5, secondly to a positive supply over a contact L1 of the line relay L, and thirdly to the terminal P by a diode d7. The collector of the transistor TA is connected by a resistor r1 to a negative supply, and by a diode d1 to the signalling terminal LC. The emitter of the transistor TB is earthed, its collector being connected by a resistor r2 to a negative supply, and by diode d2 to the signalling terminal LE. When the relay K is operated, the inlet terminals 1a, 1b are connected to the outlet terminals A, B respectively.

The scanning pulses applied to the scanning terminal S are of short duration. When no call is being originated or received at the subscribers' line 1, the application of a scanning pulse is ineffective as regards the transistors TA, TB. However, the transistor TC is switched momentarily to the conductive state, producing a fleeting signal at the terminal M. It is arranged that a fleeting signal has no effect in the switching network to which the terminals A, B, P, M, give access. For example if the terminals give access to a column of a crosspoint switch, it is arranged that the fleeting signal is insufficient to energise a crosspoint relay of the switch.

When a call is originated at the line 1, the line relay L is energised, closing contact 11 and connecting the emitter of transistor TA to the positive supply. When the next scanning pulse is applied to the terminal S, a line-calling signal is delivered at the terminal LC by the transistor TA. From the teminal LC, the line-calling signal is delivered to a persistence check circuit which has any siutable construction and does not form part of the present invention. Delivery of the signal LC is repeated at each subsequent scanning cycle until the persistence check circuit indicates that the line-calling signal is genuine and not transient. When this occurs, the scanning pulse generator is halted while delivering the scanning pulse appropriate to the line 1. Consequently the fleeting signal delivered by the transistor TC at the terminal M is prolonged, and becomes a static signal which may be used in any desired way. Conveniently the signal is used as a mark signal. When the pulse generator was halted, appropriate apparatus, such as a supervisory set, was assigned and connected to the line circuit, the line circuit receives an earth signal at the terminal P which operates the relay K. With contacts K1, K2 operated, the line relay L is cut off, and the subscribers line 1 is connected to the switching network, the loop being extended by the inlet terminals 1a, 1b and the outlet terminals A, B to a convenient point (e.g. the assigned apparatus) in the exchange. With contact L1 restored, the line-calling signal LC ceases. The earth signal at terminal P is also applied to the base of transistor TD. The transistor TD conducts, over resistors r8, r4 in series, to the prolonged earth at the terminal S, causing the transistor TB to conduct and deliver a line-engaged signal at the signalling terminal LE.

The pulse generator now resumes scanning, terminating the static delivered at the terminal M. The earth signal, received at the terminal P is maintained uninterrupted for the duration of the call. Conveniently but not necessarily the earth signal is received over the private wire of the established connections. Throughout the duration of the call, the line-engaged signal LE is regenerated each time the scanning pulse appropriate to the line 1 is applied to the terminal S. At the end of the call, the subscribers' loop is broken and the earth signal received at the terminal P is terminated. The relay K releases.

To seize the line 1 for an incoming call, the pulse generator is stopped, in the absence of a line-engaged signal LE, at the scanning pulse appropriate to the line 1. This causes the transistor TC to deliver at the terminal M a static signal, which is used as a mark signal in the switching network. After a connection has been set up to this mark signal, earth is applied to the terminal P. Relay K operates and connects the line 1 to the switching network in the same way as just described. Scanning is then resumed. Maintenance and termination of the connection take place as just described, the line-engaged signal LE being generated at each scanning.

It has already been mentioned that it is possible to use in any desired way the static signal delivered at the terminal M when the scanning pule is prolonged. The use of the signal as a mark signal in the switching network has already been suggested. Another possible use is to operate a class-of-service generator to indicate the class of service appropriate to the line 1. Some exchanges employ a selection network in which jumpers are disposed in a manner simulating or otherwise representing inter-switch links of a switching network, the jumpers being used to determine which links should be selected for establishing a speech path through the switching network. If the line circuit is installed at an exchange of this type, the signal delivered at the terminal M may be used to operate the selection network.

On occasions it may be desired to establish a second connection terminating at a line, while a first such connection is held. When this is required, the supervisory set in use for the call causes positive potential to be applied to the terminal P of the line circuit. This potential maintains the relay K energised and the transistor TD conductive. In addition the positive potential passes the diode d7 and simulates the closing of the contact L1. As a result, a line-calling signal is delivered at the terminal LC. This signal is used to establish the second connection in the manner already described.

In the line circuit just described it has been assumed that the contacts K1, K2 are change-over contacts. This need not be so. The line circuit will work in the manner described if the input terminals 1a, 1b are permanently connected to the output terminals A, B. In this case, the contacts K1, K2 are break contacts whose operation merely disconnects the relay L and earth potential from the line 1.

In FIG. 1, negative supply is shown as −50 volts and positive supply as +15 volts. It must be appreciated that the values are examples only. Any suitable values may be used. Furthermore, supplies of the same polarity need not always have the same magnitude. For example, the negative supply at the emitter of the transistor TD need not have the same magnitude as the negative supply at the collectors of the transistors TA, TB.

I. The Line Scanner and Persistence Check Equipment

Referring now to FIG. 4, a chain line 1 separates continuously-running parts from parts whose running is interruptable or whose operation is occasional. A broken line 2 separates parts which are individual to line circuits from parts used in common by the line circuits.

A continuously-running pulse generator PG drives a cyclic master counter MC which has a stage corresponding to each line circuit (not shown) which is capable of generating a call signal, the persistence of which has to be checked. The counter MC drives a cyclic data store DS which has a group of normally-empty storage cells corresponding to each line circuit. Once during each cycle of the master counter MC, the content of each group of storage cells is read, passed around a processing loop and written back into the group from which it was read. The processing loop includes an adder AD which may or may not be operative. The contents of the adder AD may be erased by an erase signal X applied through an inhibit gate $gi4$. The cells of a storage group are read serially.

Through a normally-inoperative inhibit gate $gi1$, the pulse generator PG drives a cyclic slave counter SC which, like the master counter MC, has a stage corresponding to each line circuit. The slave counter SC when not inhibited, runs in synchronism and in step with the master counter MC. The slave counter SC drives a decoder DC which causes a number of input terminals IN to be scanned cyclically. There is an input terminal IN individual to each line circuit (not shown). Each line circuit also has an individual output terminal OUT and an individual engaged output terminal ENG. When a line circuit is scanned and the line circuit is not generating a call signal, no signal is delivered at the output terminal OUT of the line circuit. On the other hand, if a call signal is being generated when a line circuit is scanned, a presence signal PS is delivered at the relevant output terminal OUT. If a line is engages when scanned, an engaged signal EE is delivered at the engaged output terminal ENG. A presence signal PS is delivered by a commoning point 3 and a gate $gi5$ to the adder AD. The adder AD has an output circuit by which two bistable devices BD, CD may be operated. The output of the bistable device BD is applied to a lead 4 and thence to any apparatus for use as may be desired.

When the master counter MC occupies stage O, a signal is applied to a gate $gi2$. When the slave counter SC occupies stage O a signal is delivered which is used to inhibit the gate $gi2$. Hence if the counters MC, SC run in step and in synchronism with each other, the gate $gi2$ does not open. But if the counters are out of step, the gate $gi2$ delivers an out-of-step signal OS each time the master counter MC passes stage O. Unless inhibited by the gate $gi3$, the OS signal is used to set the slave counter SC to stage O.

The equipment operates in the following manner. Assume initially that no line circuits are generating or have generated a call signal. All groups of the data store DS are therefore empty. The pulse generator drives the master counter MC and slave counter SC in synchronism. The data store DS is driven in synchronism with the scanning of the input terminals IN by the decoder DC. The adder AD is inoperative because no presence signal is delivered. AS each stage of the counters is reached, zero is read from and written into a group of storage cells of the data store DS, and the erase pulse X clears the calls $a - c$ of the adder AD. No signal is applied to the lead 4.

Suppose, now, that one of the line circuits generates a call signal. The next time this line circuit is scanned, a presence signal PS is delivered at the relevant output terminal OUT and is applied to the gates $gi4$, $gi5$. At the same time, zero is read from the relevant group of storage cells in the data store DS and written into the adder AD, where the cells $c$, $b$, $a$ assume the zero state if they are not already in this state. But the gate $gi5$ delivers and output, and the adder AD is arranged to respond to this output by increasing the value of a stored count by unity. The count in the cells $c$, $b$, $a$, therefore, changes from 000 to 001. After the addition, the increased count 001 is written into the store DS in the group from which 000 was read. The erase signal X is suppressed at the gate $gi4$. However, the read-out from the adder AD is destructive, and leaves the cells $c$, $b$, $a$ in the zero state, an ready for use, if required, by the line circuit corresponding to the next stage occupied by the counters MC, SC.

When the counters MC, SC complete one cycle, a presence signal is again delivered if the call signal is still being generated. This time, the adder AD increases the count from 001 to 010, and so on at each subsequent cycle provided the call signal persists, until the count 111 is read from the store DS. If the call signal is still being generated, the adder AD increases the count to 1000, the 1 being stored in the cell $d$. The count of 1000 represents a given value, which is chosen, in relation to the cycle time of the counter MC, as an indication that the generation of a call signal has been maintained for a desired minimum duration. When the count of 100 is read from the adder AD, a zero count from the cells $c$, $b$, $a$ is written into the store DS. The destructive reading of 1 from the cell $d$ causes an output which is not delivered to the store DS, but which, in the presence of a signal on lead 23 at an AND gate $ga6$, is applied to the gate $gi6$. The gate $gi6$ opens and operates the bistable device BD, which is followed immediately by the operation of the bistable device CD. With the bistable device BD operated, a signal is applied to the lead 4 for use elsewhere in the exchange. With the bistable device CD operated, the gate $gi1$ inhibits the supply of pulses from the pulse generator PG to the slave counter SC. Consequently the slave counter SC is stopped at the stage which corresponds to the line circuit which is generating the call signal. The master counter MC however, continues to run and to drive the data store DS. Since the slave counter SC is stopped, the gate $gi2$ delivers an out-of-step signal OS each time the master counter MC passes stage O. In order to prevent the slave counter SC being set to zero, the output from the bistable device CD is applied to the inhibit gate $gi3$ and suppresses the OS signals. At each cycle, zero is read from and written into the relevant group of the store DS. The adder AD however is prevented from operating because the gate $gi5$ is inhibited by the output of the bistable device BD, which is applied through an OR gate $go2$. This inhibition has the effect of suspending all counts that may have been in progress when the slave counter SC was stopped. By stopping the slave counter SC, the scanning pulse delivered at the relevant terminal IN is prolonged and may be used in any desired way. (A line circuit which makes use of this prolongation is described in British specification number 12309/73).

When the signal on lead 4 has been acted on, the generation of the call signal is caused to cease and a clearence signal is received over a lead 5. The clearance signal immediately restores the bistable device BD terminating the signal applied to the lead 4. Each time the master counter MC occupies stage O, a signal is applied, normally without result, to an AND gate $ga5$. The clearance signal, however, is also applied to the gate $ga5$. This gate therefore opens on the first occasion that the master counter MC occupies stage O after the receipt of a clearance signal. The opening of gate $ga5$ restores the bistable device CD, and removes the inhibition from the gates $gi1$, $gi3$, the latter allowing the OS signal to set the slave counter SC to stage O. The supply of pulses from the pulse generator PG having been restored, the slave counter SC resumes driving in synchronism and in step with the master counter MC. At each subsequent scanning of the line circuit the engaged signal EE is delivered. In the absence of a presence signal PS the erase signal X is effective to clear the adder AD. These events recur at each cycle until the line circuit resumes its original condition. When this occurs, the scanning no longer results in the delivery of the engaged signal EE.

In telephone exchanges, the signal applied to the lead 4 may be used to connect a piece of apparatus, for example a register, to the line circuit which is generating a call signal. When the apparatus is no longer needed, it is customary to release the apparatus so that it is not held unnecessarily. If this is done, the line circuit which was connected to the released apparatus resumes generating a call signal. It is desirable that this call signal should be ignored by the persistence check equipment. The manner of achieving this will now be described. When a piece of apparatus is to be released, a signal is sent to the line circuit to which the apparatus is connected, whereby, when scanned, the line circuit produces a presence signal PS and an engaged signal EE at the time. The engaged terminal is connected by a commoning point 6 to an AND gate $ga1$ to which presence signals are also applied. The piece of apparatus to be released also delivers a distinctive signal over a lead 7. The duration of this signal is equal to the cycle time of the master counter MC. The lead 7 terminates at an AND gate $ga3$, at which the outlet of the gate $ga1$ is also terminated. Consequently when scanning occurs, the gate $ga1$ opens followed by the gates $go2$, $ga3$. With gate $go2$ open, the inhibit gate $gi5$ is effective to suppress the operation of the adder AD. The output of the gate $ga3$ is applied to an OR gate $go1$, causing a storage cell e at the adder AD to assume the 1 state. The output of the gate $ga3$ is also applied to a lead 8 where it is used as an acknowledgement signal, the piece of apparatus is released and the distinction signal is withdrawn from lead 7. The cell e is restored when the adder AD is read, delivering an output signal which is written into a corresponding cell in the store DS. The output of the cell e is also used to operate an inhibit gate $gi6$ and so to prevent an output being delivered from the cell d of the adder AD, which would operate the bistable device BD. At the next cycle of the counter MC, the signal appropriate to the cell e is applied to the gate $go1$ by strobing an AND gate $ga2$ with an appropriate strobing pulse $te$. The distinctive signal at lead 7 having terminated, the gate $ga3$ does not open. These conditions recur at each subsequent cycle, except that the engaged signal EE is not delivered, until the line circuit is restored to normal. Restoration to normal is indicated when scanning fails to produce the presence signal PS. The gate $ga11$ fails to open, and the inhibit signal is removed from the gate $ga4$. The 1 stored in the cell e is therefore lost, when the contents of the adder AD are erased by the erase signal X. The relevant group of storage cells in the store DS is then empty, and normal conditions have been restored.

If a line is required for an incoming call, a signal received over lead 9 is compared in a comparator CA with the signals delivered by the slave counter SC. In the event of parity, the comparator CA causes an OR gate $go3$ to open and operate the inhibit gate $gi1$, stopping the slave counter SC as already described. The operation of the comparator is also indicated by a signal on a lead 22.

J. The Switching Network

The switch shown in FIG. 5 has a number of rows and columns forming an array of crosspoints. Parts only of two rows 1, 2 and two column $a$, $b$ are shown as typical. Each row and each column has two speech conductors A, B, a private conductor P and a hold conductor H. Additionally each row has a mark conductor M. The parts of the rows and columns shown define four crosspoints designated X followed by the idenity of the row and column concerned. At each crosspoint there is a relay bearing the same designation as the crosspoint. Typically the relay X1$a$ has three contacts X1$a$1, X1$a$2, X1$a$3 which, when the relay is energised, connect the A, B, P conductors of the row 1 to the A, B, P conductors respectively of the column $a$. The relay winding is connected in series with a diode d1$a$ between the H conductor of the column $a$ and the mark conductor M of the row 1. When the relay is energised, aa fourth contact X1$a$4 closes to establish a hold path by connecting the relay winding across the H conductors of the row and column. The relay X1$a$ is energised when co-operating potentials are established on the M conductor of the row 1 and the H conductor of the column $a$. Inlets to the switch are terminated at the rows, and outlets from the switch are terminated at the columns. It follows that any inlet can be connected to any outlet by operating the relay at the crosspoint of the row and column concerned.

The switch has a demand terminal in respect of each row and column, typically a row demand terminal D1 in respect of the row 1, and a column demand terminal D$a$ in respect of the column $a$. A transistor is provided in respect of each row, typically the transistor T1 in respect of the row 1. The row demand terminal D1 is connected by a resistor $r11$ and diode $d12$ to the base of the transistor T1. A diode $d11$ is connected between the private conductor P of the row 1 and the junction of the resistor $r11$ and diode $d12$. The emitter of the transistor T1 is connected by a resistor $r13$ to a −50 volt source. The collector of the transistor T1 is connected to the mark conductor M of the row 1, and by a diode $d13$ to a −50 volt source. The column demand terminals, typically D$a$, are connected by diodes, typically $da$, to a common lead $l1$ which is connected to the emitters of the transistors for all the rows. The collector of the transistor T1 is connected by a diode $d14$ and resistor $r14$ to a −50 volt source. From the junction of the resistor $r14$ and the diode $d14$ a lead $l2$ is taken to a selection request terminal Sr. The lead $l2$ is common to the transistors for all the rows. The potential at the base of the transistor T1 is dependent on that of the private conductor P of the row 1. This potential is arranged to indicate the free or busy condition of the inlet which terminates at row 1. If the inlet is free, the potential on the private conductor P is such that the transistor T1 is free to respond to the receipt of a demand signal at the row demand terminal D1. On the other hand, if the inlet is busy, the potential on the private conductor P is such as to hold the transistor T1 in its non-conductive state.

When the switch is required for use, a demand signal is applied to the row demand terminal for the row which serves the desired inlet. Another demand signal is applied to the column demand terminal for the column which serves the desired outlet. If the inlet is free, the transistor for the row conducts. For example, if demand signals are received at the terminals D1, D$a$, the transistor T1 conducts, if the inlet terminated at row 1 is free. With the transistor T1 conducting, a distinctive mark potential is applied to the mark conductor M of row 1. An output signal is also applied over lead $l2$ to a select request terminal SR. This signal is used elsewhere in an exchange at which the switch is situated. If the switch is subsequently selected for use in a connection, a signal is received at the hold terminal H of the column $a$, which signal co-operates with the mark potential on the mark conductor M to energise the relay X1$a$. The desired connection has now been established. But if the inlet terminated at row 1 is busy when the demand signals are received at the terminals D1, D$a$, the transistor T1 is held non-conductive, and the demand signals are ineffective. Consequently mark potential is not applied to the mark conductor M and the relay X1$a$ is not energised.

The switch of FIG. 5 can conveniently be used in the switching network shown in FIG. 6. The network of FIG. 6 comprises three stages A, B, C of crosspoint switches. The number of switches in any stage can vary, but has been taken as three in each stage by way of example. The switches are denoted by the letter of the stage followed by the switch number. Switch B3 has been omitted because of shortage of space. While the switches may have any suitable numbers of rows and columns, the switches shown in FIG. 6 are all assumed to have three rows and three columns. The B stage switches are shown in greater detail than the other switches. Salient features from FIG. 5 are shown in FIG. 6 and bear the same references as in FIG. 5 For simplicity the terminals A, B, P, H are shown as a single terminal referenced R for row or C for column, followed by an identifying number or letter. The thick lines denote the speech and associated hold and private conductors. Thin lines denote conductors provided for signalling purposes. A B-switch selector BS is provided which responds to signals delivered from the selection request terminals SR.

Subscribers line circuits e.g. E, F, G, H, I, are connected to the rows of the A switches, whose columns are connected to the rows of the B switches by AB links. The columns of the B switches are connected to the rows of the C switches by BC links, the columns of the C switches being connected to supervisory sets or digit detection sets e.g. U, V, W, Y, Z. Every C switch is connected to every B switch by one, and only one, BC link. Normally every A switch is connected to every B switch, though this is not essential. But when an A switch is connected to a B switch, the connection is afforded by one, and only one, AB link. In FIG. 6, the connections are shown in full in respect of the switches A1, B1, C1 only. Other connections are shown only in so far as is necessary for a description of the network. Thus the switch C1 is connected to the switches B1, B2, B3 by the links BC1, BC2, BC3 respectively. The switch B1 is also connected to the switches C2, C3 by by the links BC4, BC5 respectively. The switch A1 is connected to the switches B1, B2, B3 by AB links AB1, AB2, AB3, respectively. The switch B1 is also connected to the switches A2, A3 by the links AB4, AB5 respectively.

The switching network of FIG. 6 forms part of a telecommunication exchange which includes call control equipment operable to establish one call at a time. When a call is to be established, a first call signal is delivered by the subscriber's line equipment concerned. A second call signal is also delivered by the supervisory set or digit detection set concerned. The first call signal is applied to a row of an A switch; the second to a column of a C switch. Suppose the call is between the subscriber's line equipment E and the supervisory set U. The call signals are delivered to the first row of switch A1 and the first column of switch C1. Associated with the switch A1 is a lead $l3$ usable in common by all the subscribers line circuits E,F,G which are connected to the switch A1. The first call signal is also applied to this lead. From the lead $l3$ jumpers $j11, j12, j13$ are run to each of the B switches to which the switch A1 is s connected by AB links. At the B switch, each jumper terminates at the row demand terminal corresponding to the row at which the AB link terminates. For example, the link AB1 terminates at row R1 of the switch B1. The jumper $j11$, which corresponds to the link AB1 terminates at the row demand D1. From the lead $l3$, the first call signal is passed over the jumpers $j11, j12, j13$ to the appropriate row demand terminal of the different B switches. From the switch C1, jumpers $j21, j22, j23$ are run to each of the B switches to which the switch C1 is connected by BC links. At the B switch, each jumper terminals at the column demand terminal corresponding to the column at which the BC link terminates. For example, the link BC1 terminates at column C$a$ of the switch B1. The jumper $j21$ which corresponds to the link BC1 terminates at the column demand terminal D$a$. From the switch C1, the second call signal is passed over these jumpers if the relevant BC link is free. For example, if the link BC1 is free, the second call signal is passed over the jumper $j21$ to the column demand terminal D$a$.

Each B switch, at which the receipt of a first call signal at a row demand terminal coincides with the receipt of a second call signal at a column demand terminal responds as already described in connection with FIG. 5. considering the switch B1 as typical, the second call signal is only received at the terminal D$a$ if the link BC1 is free. The first call signal is received at the terminal D1 whether or not the link AB1 is free. But the transistor T1 is only free to respond if the link is free. Assuming the link BC1 is free, the transistor T1 responds, applying a mark potential to the mark conductor M of row 1 and delivering an output signal over lead $l2$ to the selection request terminal SR. The appearance of this output signal indicates that the switch B1 has a free AB link to the switch A1 as well as a free BC link to the switch C1. The switch B1 is therefore available for establishing the desired connection. Each other B switch responds similarly, delivering an output signal if and only if its links to the switches A1, C1 are both free. A B-switch selector BS responds to an output signal delivered at any selection request terminal SR to select one of the output signals to the exclusion of any others. The section of an output signal indicated the selection of the B switch delivering the selected ouput signal to the exclusion of other available B switches. Selection is indicated by delivery of an establish signal over a lead individual to the selected B switch.

The B-switch selector may have any suitable construction, and may for example be based on the so-called mark-extension circuit described in British Pat. specification No. 1,131,974.

The B-switch selector has an outlet $b1$, $b2$... corresponding to each B switch. These outlets are connected by further jumpers to the C switches where they terminate on mark conductors of the rows at which the relevant BC links terminate. For example, the switch B1 is connected by the links BC1, BC4, BC5 to the first rows of the switches C1, C2, C3 respectively. The outlet $b1$ is therefore connected by the jumpers $j31$, $j34$, $j35$ to the mark conductors of the first rows of the switches C1, C2, C3. An establish signal delivered by the B-switch selctor over the outlet $b1$ co-operates - in the present example - with the second call signal applied by the supervisory set U to the first column of the switch C1. The appropriate crosspoint relay operates, sending a signal over the H conductor of link BC1 to terminal H (FIG. 5) of column $a$ of switch B1. At crosspoint X1$a$ of switch B1, the signal on the H conductor co-operates with the mark signal applied to the mark conductor M by the conducting transistor T1. Relay X1$a$ operates, extending the connection over link AB1 to the first column of switch A1, and causing a signal which co-operates with the first call signal to energise the appropriate crosspoint relay. The connection of the line circuit E to the supervisory set U has been effected as required. In the switch B1 the relay X1$a$ is held over its own operated contact X1$a$4, the hold current developing a potential which back biases the diode $d1a$.

The first and second call signals are now terminated. In the switch B1, the transistor T1 ceases to conduct, and is held non-conductive by busy potential applied indirectly to the private conductor P of row 1 from the supervisory set U. The call control equipment is released for use with another call.

A suitable C switch for use in the network of FIG. 6 is illustrated in FIG. 7. In FIG. 7, the four crosspoints formed at the crossings of rows 1, 2 and columns $a$, $b$ are shown as typical. Each row and column has A, B, P, H conductors, the rows additionally having an M conductor. At each crosspoint, a relay is disposed, all in the manner already described. The H conductor of each column is connected by a diode $ha$, $hb$. . . . to a lead $l4$ which is connected by a resistor $r17$, to a +15 volt supply. A transistor $t1$, $t2$. . . is provided for each row of the switch. The lead $l4$ is connected to the base of each transistor by a resistor in series with a diode, typically the resistor $r15$ and diode $d15$ in respect of the transistor $t1$. The junction of the resistor $r15$ and diode $d15$ is connected to the private conductor P of the row 1 by diode $d16$. In this way, the switching of the transistor $t1$, $t2$. . . is controlled by the potential appearing at the lead $l4$, unless any individual transistor is inhibited by a potential applied to its base from the private conductor P of the relevant row. The collectors of the transistors $t1$, $t2$. . . . from which outputs are taken, are connected individually by resistors $r16$, $r26$. . . to a $-50$ volt supply. The emitters are connected by a common lead $l5$ to the junction of a zener diode $z$ and a resistor $r18$, which are connected in series between earth and a +50 volt supply. The switch shown in FIG. 7 is assumed to be the switch C1 and is shown connected accordingly. The working of the switch will be explained with reference to the call already discussed. The second call signal is delivered by the supervisory set U1 as a signal on the H conductor of column $a$. This signal is passed by the diode $ha$ to the lead $l4$, where it is applied to the bases of all the transistors $t1$, $t2$. . . Those transistors which are not inhibited are switched into conductivity. Taking row 1 and transistor $t1$ as typical, the transistor $t1$ becomes conductive in response to the second call signal, unless it is inhibited by the potential of the private conductor P of row 1. Row 1 is connected to the link BC1, and it is aaranged that the transistor $t1$ can only become conductive if the link BC1 is free. Assuming that the link BC1 is free, the transistor $t1$ conducts over resistor $r16$ and zener diode $z$ in series. The lead $l5$ assumes a potential determined by the characteristics of the zener diode $z$. The emitter of the transistor $t1$ assumes a related potential. The jumper J21, which corresponds to the link BC1, is connected to the collector of the transistor $t1$, and the said related potential at the collector is carried by the jumper $j21$ to the demand terminal D$a$ of the switch B1, where it is employed as a demand signal as already described.

Assuming that there is a free AB link terminating at the switch B1 and that this switch is selected by the B switch selector BS (FIG. 6), an established signal is delivered over lead $b1$ and jumpers $f31$, $f34$, $j35$. At the switch C1 (FIG. 7) the jumper $j31$, is terminated at the M conductor of row 1. The establish signal co-operates with the second call signal present at the H conductor of column $a$. The relay at the crosspoint of row 1 and colUmn $a$ becomes energised, and closes a contact which connects the winding between the H conductors of the row and column. This produces a change of potential at the H conductor of the link BC1, which is employed at the switch B1 in the manner already described.

FIG. 8 shows an A-switch in the network of FIG. 6 and the manner of connecting subscribers' line circuits thereto . Typically the connection of the subscribers line circuits E, F, G, to the switch A1 is shown. The switch has rows and columns each with A, B, P, H, conductors. Each row additionally has an M conductor. A relay is provided at the crossing of each row and column, all as priviously described. The switch columns, $a$, $b$, $c$, are connected to links AB1, AB2, Ab3, respectively. The subscribers' line circuits E, F, G, are connected to the rows 1, 2, 3 respectively. Each subscribers line circuit has five terminals connected respectively to the five conductors A, B, P, H, M, of the appropriate row. The M conductors are connected by individual diodes $dE$, $dF$, $dG$ to a common resistor $r19$ and thence to the base of a transistor T$a$. The emitter of the transistor T$a$ is connected to a $-50$ volt supply. The collector of the transistor T$a$ is connected by a resistor $r20$ to earth, and by a common lead $l3$ and isolating diodes $da11$, $da12$, $da13$ to the jumpers $j11$, $j12$, $j13$. As already explained, the jumpers $j11$, $j12$, $j13$ corresponds respectively to the links AB1, AB2, AB3. The first call signal (already mentioned) is delivered by the line circuit E at the M conductor of the row 1. The signal is applied through the diode $dE$ and resistor $r19$ to the base of the transistor t$a$ which becomes conductive. A singal is produced on the lead $l3$ which is passed over the jumpers j11, j12, j13 to the switches B1, B2, B3 where it is used in the manner already described. After a B-switch has been selected and an established signal has been effective in a C-switch, a crosspoint in the selected B-switch operates, and a signal is received over the H conductor of the AB link from the selected B-switch. This signal co-operates with the first call signal on the M conductor of the row 1, energising the relay at the appropriate crosspoint and completing the desired connection.

K. Miscellaneous.

a. The Auxiliary Highway 1h. The auxiliary highway 1h makes it possible to pass to the interface units served by the first highway 1H (that is, the units id, iq, ik) signals whose duration exceeds that of the scanning pulses S1. To avoid confusion of signals, the auxiliary highway is used in respect of one cell only at a time, and access to it is governed by the master flip-flop FM After the flip-flop FM has been switched to the 1 state, a signal is applied by the logic network LN to the conductor 1Hy. At the interface unit in use, for example the unit id which is scanned by the pulse S1a, the gate ga1y opens when the unit is next scanned. As a result, the flip-flop F operates and enables the (typical) gates ga 11a, ga 11p. The auxiliary highway 1h may now be used as required. When the auxiliary highway is no longer wanted, a signal is applied to the conductor 1Hz which restores the flip-flop F. The master flip-flop FM is also restored.

b. Call Queuing. Queuing of calls to the attendant can be provided for if a registor section is devoted to the purpose. Calls to the attendant are registered in the section on receipt, and are dealt with in turn when the attendant is free.

c. Waiting Limits. It is possible to raise an alarm if waiting becomes excessive. For example, suppose a signal on lead 4 is delayed at the logic network LN by a flood of incoming calls on lead 21. If a register section is provided for the purpose, a count can be registered therein indicative of the extent to which the signal on lead 4 is being delayed.

It is to be understood that the foregoing description of specific examples of the invention is made by way of example only and is not to be considered as a limitation in its scope.

What is claimed is:

1. A telecommunication exchange which includes: a switching network in which a call may be established; supervisory sets instrumental in establishing such a call; an interface unit corresponding to each supervisor set; a register having a register section corresponding to each interface unit, a section being capable of registering information relating to a call to be established; a logic network in which information relating to a call may be processed; a time-shared signal highway connecting the logic network and the interface units, a cyclic scanner which scans the register sections and the interface units, and once in each scanning cycle, effectively connects a scanned register section through the logic network and the time-shared highway to the interface unit to which the scanned register section corresponds, whereby signals may be passed between a supervisory set instrumental in establishing a call and a register section registering information about the call with or without processing in the logic network; and an auxiliary signal highway connecting the logic network and the interface units, the auxiliary highway being usable in respect of one call only at a time in response to a signal applied to an interface unit over the time-shared highway, said exchange also including further interface units; an interruptable scanner which scans the said further units; and a second signal highway terminated at the logic network, and connectable to a scanned one of the further units on the interruption of the scanner in response to an interrupt signal delivered by the scanned unit, said exchange further including a line circuit individual to each line served by the exchange, and a switching network or crosspoint switches; in which exchange, information relating to a call to be established is signalled into a register section from a calling line by way of the relevant line circuit, the switching network, an interface unit, the time-shared highway and the logic network.

2. An exchange as claimed in claim 1 which includes a crosspoint switch by which a signalling path may be established between a signalling interface unit, effectively connectable to the time-shared highway, and one of said further interface units connectable to the second signal highway.

3. An exchange as claimed in claim 1 in which the line circuits are sequentially scanned, and in which the scanning of the line circuits is interrupted after a signal generated by a calling line has persisted for a predetermined period.

* * * * *